US012809171B2

(12) United States Patent
Le et al.

(10) Patent No.: US 12,809,171 B2
(45) Date of Patent: Nov. 24, 2026

(54) REFLECTIVE POLARIZER INCLUDING A FRESNEL OPTICAL ELEMENT FOR NEAR EYE DISPLAY

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 472 days.

(21) Appl. No.: 18/143,445

(22) Filed: May 4, 2023

(65) Prior Publication Data

US 2024/0369835 A1 Nov. 7, 2024

(51) Int. Cl.
*G02B 27/01* (2006.01)
*B29D 11/00* (2006.01)
(Continued)

(52) U.S. Cl.
CPC ...... *G02B 27/0172* (2013.01); *B29D 11/0048* (2013.01); *G02B 3/08* (2013.01); *G02B 5/3025* (2013.01); *G02B 27/1006* (2013.01)

(58) Field of Classification Search
CPC .... G02B 27/0172; G02B 3/08; G02B 5/3025; G02B 27/1006; G02B 27/283; B29D 11/0048
See application file for complete search history.

(56) References Cited

U.S. PATENT DOCUMENTS 10,663,745 B2 5/2020 Ouderkirk et al.
2010/0007846 A1 1/2010 Fermigier et al.
(Continued)

FOREIGN PATENT DOCUMENTS

JP 2020-515903 A 5/2020
JP 2020-519964 A 7/2020
JP 2021-105593 A 7/2021

OTHER PUBLICATIONS

Herbert Gross. Handbook of Optical Systems vol. 3: Aberration Theory and Correction of Optical Systems. p. 372-376. Copyright © 2007 WILEY-VCH Verlag Gmbh & Co. KGaA, Weinheim ISBN: 978-3-527-40379-0 (Year: 2006).*
(Continued)

*Primary Examiner* — Collin X Beatty
(74) *Attorney, Agent, or Firm* — ARENTFOX SCHIFF LLP

(57) ABSTRACT

Aspects of the disclosure provide an optical system that includes a first lens including a first optically transparent member having a first surface and a second surface and a reflective polarizer on the first surface. The first surface of the first lens includes a first region and a second region, the first region of the first surface is smooth and at a center of the first surface, and the second region of the first surface includes a Fresnel structure and surrounds the first region. The reflective polarizer includes a first region and a second region, the first region of the reflective polarizer matches a profile of the first region of the first surface of the first lens, and the second region of the reflective polarizer matches a profile of the second region of the first surface of the first lens.

18 Claims, 12 Drawing Sheets

(51) Int. Cl.
*G02B 3/08* (2006.01)
*G02B 5/30* (2006.01)
*G02B 27/10* (2006.01)

(56) References Cited

U.S. PATENT DOCUMENTS

| | | | |
|---|---|---|---|
| 2010/0259717 | A1 | 10/2010 | Fermigier et al. |
| 2020/0379226 | A1 | 12/2020 | Steiner et al. |
| 2022/0146803 | A1 | 5/2022 | Etter et al. |
| 2022/0350147 | A1 | 11/2022 | Ouderkirk et al. |

OTHER PUBLICATIONS

Frisen, Lars, and Anders Glansholm. "Optical and neural resolution in peripheral vision." Investigative Ophthalmology & Visual Science 14.7 (1975): 528-536.
Costa, Ana Luiza Fontes de Azevedo, and Vagner Rogério dos Santos. "From vision to citizenship: types of tables to assess reading in special education." Revista Brasileira de Oftalmologia 77 (2018): 296-302.
Wong, Timothy L., et al. "Folded optics with birefringent reflective polarizers." Digital Optical Technologies 2017. vol. 10335. SPIE, 2017, pp. 1-8.
Hao, B., Wong, T., Le, J., Aastuen, D., Kotz, A., Rosen, D., McGrath, K. and Kent, S., "Building a Predictive Model of Contrast Ratio of Folded Optic Lens Systems for Virtual Reality". 3M Company, 3M Center, St. Paul, MN, 2022, pp. 1-4.
Kress, B.C. and Peroz, C., Feb. 2020. Optical architectures for displays and sensing in augmented, virtual, and mixed reality (AR, VR, MR). In Proc. SPIE (vol. 11310, p. 1131001).
Kress, B.C., 2020. Optical architectures for augmented-, virtual-, and mixed-reality headsets. (No Title). chapter 5-6 (p. 37-52).
International Search Report with Written Opinion for PCT/US2023/074530, issued Jan. 19, 2024, 30 pages.
Office Action received for Japanese Patent Application No. 2025-553840, mailed on Sep. 15, 2026, 9 pages (4 pages of English Translation and 5 pages of Original Document).

* cited by examiner

REFLECTIVE POLARIZER INCLUDING A FRESNEL OPTICAL ELEMENT FOR NEAR EYE DISPLAY

TECHNICAL FIELD

The present disclosure relates to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide an optical system. The optical system includes a first lens and a reflective polarizer. The first lens includes a first optically transparent member having a first surface and a second surface. The reflective polarizer is on the first surface and is configured to pass through light having a first polarization state and reflect light having a second polarization state that is orthogonal to the first polarization state. The first surface of the first lens includes a first region and a second region, the first region of the first surface is smooth and at a center of the first surface, and the second region of the first surface includes a Fresnel structure and surrounds the first region. The reflective polarizer includes a first region and a second region, the first region of the reflective polarizer matches a profile of the first region of the first surface of the first lens, and the second region of the reflective polarizer matches a profile of the second region of the first surface of the first lens.

In an example, the first surface includes a third region, the third region of the first surface is smooth and surrounds the second region of the first surface, and the reflective polarizer includes a third region that matches a profile of the third region of the first surface. In an example, the first surface and the second surface are aspheric.

In an example, the first polarization state is a first linear polarization state, and the second polarization state is a second linear polarization state.

In an example, the optical system includes a second lens including a second optically transparent member having a third surface and a fourth surface. The second lens can be a plano-spheric lens.

In an example, the optical system includes a beam splitter configured to partially transmit and partially reflect light beams from a display device and a quarter waveplate (QWP) that is positioned between the beam splitter and the reflective polarizer. A pixel array in the display device is configured to generate light beams, the beam splitter is disposed on the third surface or the fourth surface of the second lens, and the second lens is positioned between the display device and the first lens.

In an example, the first optically transparent member is made of poly(methyl methacrylate) (PMMA). A thickness of the reflective polarizer can be from 50 to 100 microns.

The Fresnel structure can include a plurality of grooves, and each depth of the plurality of grooves can be less than 100 microns.

Aspects of the disclosure provide a fabrication method. The fabrication method includes positioning a film including a first material on a first mold and filling a mold cavity between a first mold surface of the first mold and a second mold surface of a second mold with a second material such that the first material conforms to a first surface profile of the first mold surface. A first lens can be formed with the solidified second material. A first surface of the first lens can be attached to the film. The first surface of the first lens includes a first region and a second region, the first region of the first surface is smooth and at a center of the first surface, and the second region of the first surface includes a Fresnel structure and surrounds the first region. The film includes a first region and a second region, the first region of the film matches a profile of the first region of the first surface of the first lens, and the second region of the film matches a profile of the second region of the first surface of the first lens.

In an example, a first maximum sagitta difference between (i) a maximum sagitta of the first mold surface of the first mold and (ii) a minimum sagitta of the first mold surface of the first mold is less than 0.6 millimeters. A curvature of the film resulting from the positioning of the film can be equal to a curvature of the film when the filling of the mold cavity starts.

The curvature of the film that is positioned on the first mold can be flat.

The fabrication method can include forming the mold cavity with the first mold and the second mold having the second mold surface after the positioning the film. A second surface of the first lens can conform to a second surface profile of the second mold surface.

The fabrication method can include forming the mold cavity with the first mold and the second mold prior to the positioning the film. A second surface of the first lens conforms to a second surface profile of the second mold surface.

The first mold surface of the first mold includes a Fresnel structure.

The first mold surface of the first mold includes a first region that is smooth and the Fresnel structure that surrounds the first region.

In an example, a molten resin including the second material is injected into the mold cavity.

In an example, the film is a reflective polarizer configured to pass through light having a first polarization state and reflect light having a second polarization state that is orthogonal to the first polarization state.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
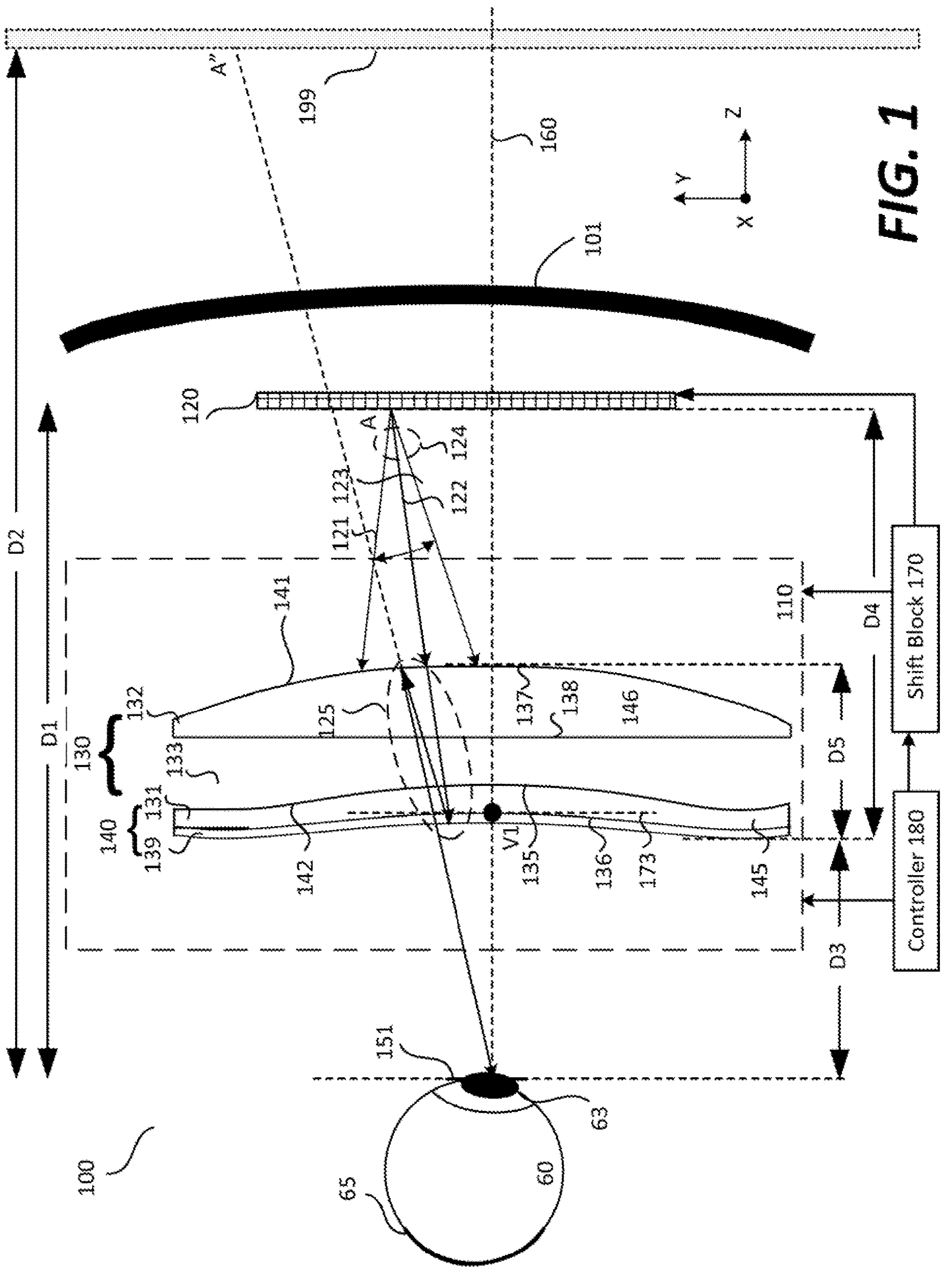
FIG. 1 shows a display system in a side view according to some embodiments of the disclosure.

A display system can include an optical system that directs light beams from a display device or a real object to a light receiver. In an example, the optical system and the display device can be configured to be positioned within a distance threshold (e.g., 35 mm) of an eye of a user, and the display system can be referred to as a near eye display (NED) system. For example, the display system is a head mounted display (HMD) system worn by a user.

The optical system can include refractive optical element(s) (e.g., a lens) that refract light. For example, light is refracted at surface(s) of a lens. In various embodiments, a refractive power or an optical power (e.g., indicated by a focal length) of a lens can be determined by shape(s) of respective surface(s) (or surface curvature(s)) of the lens. Surfaces of a lens in the optical system can have any suitable shapes, such as planar shape(s), spheric shape(s) with any suitable radius of curvature, aspheric shape(s), or other shape(s).

In addition to lenses, the optical system can include thin-film optical component(s). A thin-film optical component can include one or more layers of optical films. A thickness of a thin-film optical component can be thin, for example, less than a thickness threshold (e.g., 100 microns). Thin-film optical components in the optical system can include a reflective polarizer, a beam splitter (BS), a waveplate (e.g., a quarter waveplate (QWP)), and the like. A thin-film optical component (e.g., a reflective polarizer, a BS, a QWP) can be disposed on a surface of a lens, and can conform to a surface profile (or a shape) of the surface of the lens.

In an embodiment, a reflective polarizer is disposed on a surface of a lens, and an optical component including the lens and the reflective polarizer is referred to as a reflective polarizer lens (or an RP lens). The reflective polarizer lens can be fabricated using a co-molding process (or a co-mold process). In the co-mold process, an optical film including a first material (or an RP material) used to fabricate the reflective polarizer can be positioned on a first mold. A mold cavity between a first mold surface of the first mold and a second mold surface of a second mold can be filled with a second material such that the first material of the optical film conforms to a first surface profile of the first mold surface. Thus, the reflective polarizer and the lens can be formed based on the first material and the second material, respectively, for example, simultaneously in the co-mold process.

A shape of the surface of the lens can be represented by a sagitta (or a sag). A sagitta can indicate material removed to yield the surface of the lens. In an example, a sagitta is a displacement along an optic axis of the surface from a vertex (e.g., an intersection of the surface and the optical axis). The shape of the surface of the lens can be represented by a maximum absolute sagitta, a maximum sagitta difference, an average absolute sagitta of respective locations on the surface of the lens, or the like. In an embodiment, a sagitta (e.g., a maximum absolute sagitta or an average absolute sagitta) increases with a curvature of the surface.

In some examples, the surface (also referred to as the RP surface) onto which the reflective polarizer is conformed has a large curvature and a large sagitta, and the lens can be relatively thick. The first mold surface of the first mold is to have an identical or similar shape as that of the RP surface. To fabricate the reflective polarizer lens using the co-mold process when the RP surface of the lens has a large sagitta, the optical film including the first material can be formed (or pre-formed), for example, thermally and/or mechanically using a form process (or preforming process) to have a curved shape. The curved shape of the preformed optical film can better match the surface profile of the RP surface of the lens (or the intended lens shape) than the non-formed optical film (e.g., the optical film without being preformed is flat). For example, the optical film is thermally formed (or thermally preformed) to have a curved shape that at least conforms partially to the surface of the lens (or the first mold surface of the first mold). The preforming process described above can reduce a mismatch between a surface profile of the first mold surface and the surface profile of the preformed optical film. Otherwise, a mismatch between the surface profile of the first mold surface and the surface profile of the non-formed optical film may be relatively large, and the optical film can be folded in the co-mold process, for example, resulting in defects in the RP lens.

According to an embodiment of the disclosure, the lens (e.g., a Fresnel lens) can include a microstructure. The Fresnel lens can include a microstructure such as a Fresnel structure including a plurality of grooves, such as concentric grooves or a set of concentric annular sections. The smooth RP surface of the lens can be modified into a grooved RP surface or an unsmooth RP surface of the Fresnel lens. As described in FIG. 6A, the grooved RP surface of the Fresnel lens can maintain the surface curvature of the smooth RP surface of the lens while using less optical material for the lens. The grooved RP surface of the Fresnel lens can be flatter than the RP surface of the lens. A sagitta of the RP surface of the Fresnel lens onto which the reflective polarizer is disposed can be smaller than a sagitta of the RP surface of the lens without a Fresnel structure. The Fresnel lens can be thinner or flatter than the corresponding lens. The Fresnel lens and the corresponding lens can have the same or similar focal length.

An optical component including the Fresnel lens and the reflective polarizer can be referred to as a Fresnel RP lens. In various embodiments, the Fresnel RP lens can be fabricated more advantageously than the RP lens. When the co-mold process is used to fabricate the Fresnel RP lens, the forming step (e.g., the preforming step prior to filling a mold cavity) described above can be skipped because the RP surface of the Fresnel RP lens has a smaller sagitta than that of the RP surface of the RP lens. For example, a maximum sagitta or an average sagitta of the RP surface of the Fresnel RP lens is less than a sagitta threshold. The RP surface of the Fresnel RP lens can be flatter than the RP surface of the corresponding RP lens. The RP surface of the Fresnel RP lens can be substantially flat. A sagitta of the first mold surface of the first mold used to fabricate the Fresnel RP lens can be less than the sagitta threshold, such as substantially flat. Further, the grooved Fresnel structure (e.g., the Fresnel groove structure including the plurality of grooves) may help to bleed air in a manufacturing process (e.g., the co-mold process) to reduce lens defects. Otherwise, without the plurality of grooves in the Fresnel structure, defects can occur, for example, due to air bubbles trapped between the smooth RP film and a smooth mold insert (e.g., the smooth first mold surface).

FIG. 1 shows a display system (e.g., a near eye display system) (100) in a side view according to some embodiments of the disclosure. The display system (100) includes an optical system (110), a display device (120), a shift block (170), a controller (180), and/or the like. The optical system (110) can include a lens system (130), a beam splitter (BS) (141), a reflective polarizer (139), and/or the like. In an example, the optical system (110) includes a quarter-wave plate (QWP) (142). The display device (120) can include a pixel array configured to emit light beams and display images. The optical system (110) can direct the emitted light beams from the display device (120) or a real object to an area or a viewing area (151). In an example, the area (151) is located in an XY plane. In an example, the area (151) is referred to as an exit pupil of the display system (100). The XY plane includes an X axis and the Y axis that is orthogonal to the X axis. A light receiver or detector, such as an eye (60) of a user or the like, can be located at the area (151). In an example, a lens (63) in the eye (60) forms an image on a retina (65) of the eye (60), and thus the eye (60) perceives an image on the display device (120) as a virtual image, such as a virtual image (199) in FIG. 1. The virtual image (199) appears at a distance D2 from the area (151) and appears larger than the image on the display device (120). The distance D2 is larger, and in some cases much larger, than a distance D1 between the area (151) and the display device (120).

An optical cavity can be formed between the beam splitter (141) and the reflective polarizer (139). In the example shown in FIG. 1, the optical cavity can include the lens system (130) and the QWP (142). As described below, an optical path of a light ray in a light beam is folded in the optical cavity between the beam splitter (141) and the reflective polarizer (139). Accordingly, the display system (100) can be a NED system (e.g., an HMD system worn by a user), and the optical system (110) and the display device (120) can be positioned within a distance threshold (e.g., 35 mm) of an eye of a user (e.g., the eye (60)).

The lens system (130) can include one or more lenses, such as a first lens (131) and a second lens (132). The first lens (131) can include an optically transparent member (145) having two opposite surfaces (135)-(136). The second lens (132) can include an optically transparent member (146) having two opposite surfaces (137)-(138). In an example, the first lens (131) and the second lens (132) are converging lenses having respective positive focal lengths. An optical axis (160) of the lens system (130) can be parallel to a Z axis that is perpendicular to the XY plane. The first lens (131) and the second lens (132) can have circular symmetry around the optical axis (160). The first lens (131) and the second lens (132) can be separated by a gap (133). In an example, the gap (133) is larger than 0. In another example, a portion of the first lens (131) is in contact with a portion of the second lens (132), for example, the smallest distance between the first lens (131) and the second lens (132) is zero.

Surfaces of the one or more lenses in the lens system (130), such as the surfaces (135)-(138), can have any suitable shapes or surface curvatures, such as planar shape(s) parallel to the XY plane, spheric shape(s) with any suitable radius of curvature, aspheric shape(s), or other shape(s). Shapes of the surfaces (135)-(138) can be determined based on design parameters, such as focal lengths, aberration requirements, lens thicknesses, flatness(es) of the lenses, and the like.

The reflective polarizer (139) can be configured to pass through a light beam having a first linear polarization state and reflect a light beam having a second linear polarization state. The second linear polarization state is orthogonal to the first linear polarization state. The reflective polarizer (139) can be formed on a surface (e.g., (136)) in the lens system (130). The reflective polarizer (139) can include a thin film, for example, including one or more layers of optical films. A thickness (e.g., a maximum thickness or an average thickness) of the reflective polarizer (139) can be less than a RP thickness threshold, such as 500 microns, 200 microns, 100 microns, or the like. The reflective polarizer (139) can be disposed onto the surface (136) of the first lens (131). A shape of the reflective polarizer (139) can conform substantially or completely to a shape (e.g., a planar shape, a spheric shape, an aspheric shape, or the like) of the surface (136) of the first lens (131). In the example shown in FIG. 1, the surface (136) of the first lens (131) is aspheric, and thus a shape of the reflective polarizer (139) is aspheric. The first lens (131) can be an aspheric-aspheric lens. In an example, an optical component referred to as an RP lens (140) includes the first lens (131) and the reflective polarizer (139) that is attached or bonded to the first lens (131).

The second lens (132) can be a spheric-spheric lens, a plano-spheric lens, an aspheric-spheric lens, an aspheric-aspheric lens, or the like. In the example of FIG. 1, the second lens (132) is a plano-spheric lens. In an example, the BS (141) is disposed onto one of the surfaces (137)-(138) of the second lens (132), and an optical component including the second lens (132) and the BS (141) is referred to as a BS lens. In the example shown in FIG. 1, the BS (141) is disposed onto the surface (137). The BS (141) can include a thin film, for example, including one or more layers of optical films. A thickness of the BS (141) can be less than a BS thickness threshold. A shape of the BS (141) can conform substantially or completely to a shape (e.g., a planar shape, a spheric shape, an aspheric shape, or the like) of the one of the surfaces (137)-(138) of the second lens (132). In an example, the lens system (130) includes the RP lens (140) and the BS lens.

The optically transparent members (145)-(146) can include any suitable material(s) including but not limited to glass (e.g., borosilicate glass, dense flint glass), polymer, plastic material(s), such as poly(methyl methacrylate) (PMMA), polyimide, acrylic, styrene, cyclic olefin polymer, cyclic olefin co-polymer, polycarbonate, and/or the like. A glass lens can be fabricated by grinding and polishing, a glass molding method, and/or the like. A polymer or plastic lens can be fabricated by diamond turning, polishing, injection molding, casting, and/or the like.

The display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an embodiment, a "near eye" display system can include an optical system (e.g., including one or more optical elements) and a display device that are placed within the distance threshold of an eye of a user when the NED system (100) (e.g., an HMD, or smart glasses) is utilized. Referring to FIG. 1, the distance D1 between the display device (120) and the area (151) can be less than or equal to the distance threshold. In an example, the distance D1 is between the display device (120) and the eye (60).

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, a pixel A on the display device (120) emits a light beam including a bundle of light rays in suitable directions. A subset (124) of the light rays in the light beam can be directed by the optical system (110) to the area (151). An angular span of the subset (124) of the light beam can be determined based on an acceptance angle ω of the optical system (110). Three light rays (121)-(123) of the subset (124) of the light beam are shown in FIG. 1. The three light rays (121)-(123) can include two boundary rays (121) and (123) and a center ray (122).

In general, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam (e.g., the light beam generated from each pixel) can have any suitable polarization state(s) or DOP. In an example, the light beam is circularly polarized having a DOP of 100%. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam below. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam below.

According to an embodiment of the disclosure, the light beams generated by the display device (120) can be circularly polarized or linearly polarized.

The optical system (110) can be configured to modify the light beams generated by the display device (120), and direct the modified light beams to the area (151). In some embodiments, the optical system (110) can include diffractive elements (gratings and prisms), refractive elements (lenses), guiding elements (e.g., planar waveguides and/or fibers), and polarizing elements (e.g., polarizers, half-wave plates, quarter-wave plates, polarization rotators, Pancharatnam-Berry (PB) Phase lens, and the like).

The optical system (110) can be disposed between the display device (120) and the area (151). The second lens (132) can be disposed between the first lens (131) and the display device (120). In an example, the first lens (131) can be referred to as an eye lens according to a proximity to the area (151) (e.g., the eye (60)), and the second lens (132) can be referred to as a display lens according to a proximity to the display device (120).

The BS (141) and the reflective polarizer (139) can be disposed between the area (151) and the display device (120). The quarter-wave plate (142) can be disposed between the beam splitter (141) and the reflective polarizer (139), such as over the surface (135). Anti-reflection (AR) coating(s) can be applied to any suitable surface(s) of the lens system (130) to reduce unwanted reflections of the light beams.

The beam splitter (141) can be configured to partially transmit and partially reflect light beams incident onto the beam splitter (141). The beam splitter (141) can have an average optical transmittance T and an average optical reflectance R. In an example, a sum of T and R is 1 (i.e., 100%) over a wavelength range (e.g., 380 to 780 nanometers (nm)). The average optical transmittance T and the average optical reflectance R of the beam splitter (141) can be referred to as T/R. T or R can be in a range (e.g., from 40% to 60%). In an example, the beam splitter (141) has T/R of 40/60, 50/50, or 60/40. For example, if T and R are 50%, the beam splitter (141) transmits 50% and reflects 50% of the light beams incident onto the beam splitter (141). The beam splitter (141) partially transmits and partially reflects light beams from the display device (120).

A polarization state of a light beam can be altered as the light beam passes through certain optical elements. In an embodiment, a polarization state of a light beam can be altered by a waveplate or a retarder as the light beam travels through the waveplate. The quarter-wave plate (142) can alter a polarization state of a light beam traveling through the quarter-wave plate (142) by 90° or π/2. In an example, the quarter-wave plate (142) converts linearly polarized light into circularly polarized light or circularly polarized light into linearly polarized light. The quarter-wave plate (142) can be formed on a surface (e.g., (135)) in the lens system (130).

Referring to FIG. 1, the beam splitter (141) is disposed on the surface (137) of the second lens (132), and the reflective polarizer (139) is disposed on the surface (136) of the first lens (131). The quarter-wave plate (142) is formed on the surface (135) of the first lens (131). The optical cavity can be formed between the beam splitter (141) and the reflective polarizer (139). The optical cavity can include the lens system (130), the gap (133), and the QWP (142).

The beam splitter (141), the quarter-wave plate (142), and the reflective polarizer (139) can conform to shapes of respective surfaces. For example, the beam splitter (141) and the quarter-wave plate (142) are curved to conform to shapes of the surfaces (137) and (135), respectively. The reflective polarizer (139) can be curved to conform to the shape of the surface (136).

The light beams emitted from the display device (120) can be partially transmitted by the beam splitter (141). Subsequently, the light beams pass the optical cavity a plurality of times. In an example, the light beams pass the optical cavity for a first time and are reflected by the reflective polarizer (139). The light beams then pass the optical cavity for a second time and are partially reflected by the beam splitter (141). After passing the optical cavity for a third time, the light beams are transmitted by the reflective polarizer (139) and reach the area (151).

The optical system (110) includes a catadioptric optical system. For example, the catadioptric optical system (110) includes (i) refractive optical components (e.g., the lens system (130)) and (ii) reflective optical components (e.g., the beam splitter (141) when acting as a reflector to reflect light and the reflective polarizer (139) when acting as a reflector to reflect light).

The catadioptric optical system (110) may include a polarized catadioptric optical system. For example, each time the light beams pass through the QWP (142), a polarization state of the light beams is manipulated by the QWP (142). Accordingly, the light beams are in one polarization state and is reflected by the reflective polarizer (139) after the first pass, and the light beams are in another polarization state and is transmitted by the reflective polarizer (139) after passing the optical cavity for a third time.

The optical system (110) may be referred to as a folded optical system. As light beams are reflected between the beam splitter (141) and the reflective polarizer (139), and travel multiple times (e.g., three times) in the optical cavity, an optical path between the display device (120) and the area (151) includes a folded path (125) between the beam splitter (141) and the reflective polarizer (139). The folding of the optical path can allow the distance D1 to be decreased, and the display system (100) including the optical system (110) can be used as a NED system. In an example, the lens system (130) is designed to have a relatively small thickness D5, and may be referred to as a pancake lens system.

Referring to FIG. 1, the ray (122) emitted from the pixel A of the display device (120) is partially transmitted by the beam splitter (141). Subsequently, the ray (122) passes the optical cavity for a first time where the ray (122) sequentially passes through the second lens (132), the gap (133), the QWP (142), and the first lens (131).

After the ray (122) passes the optical cavity for the first time, the ray (122) is reflected back into the optical cavity by the reflective polarizer (139). Subsequently, the ray (122) passes the optical cavity for a second time where the ray (122) sequentially passes through the first lens (131), the QWP (142), the gap (133), and the second lens (132).

After the ray (122) passes the optical cavity for the second time, the ray (122) is partially reflected back into the optical cavity by the beam splitter (141). Subsequently, the ray (122) passes the optical cavity for a third time where the ray (122) sequentially passes through the second lens (132), the gap (133), the QWP (142), and the first lens (131). Then, the ray (122) is transmitted by the reflective polarizer (139) and travels to the area (151). In an example, the ray (122) is focused by the lens (63) of the eye (60) onto the retina (65), and the eye (60) perceives the ray (122) as if the ray (122) is from a virtual point A" on the virtual image (199).

The light beams emitted from the pixels (e.g., including the pixel A) in the display device (120) can be circularly polarized, for example, in a first circular polarization state. The beam splitter (141) partially transmits the ray (122) in the first circular polarization state. Then the ray (122) passes the optical cavity for the first time as described above. During the first pass, the first circular polarization state of the ray (122) is converted to the second linear polarization state by the QWP (142). The second linear polarization state is along a block direction of the reflective polarizer (139). The block direction of the reflective polarizer (139) refers to a direction where if an electric field vector of a light beam is along the block direction, the light beam is blocked by the reflective polarizer (139) and is not transmitted through the reflective polarizer (139). The reflective polarizer (139) reflects the ray (122) having the second linear polarization state, for example, with a relatively high average reflectance that is above or equal to a value (e.g., 90%) over a wavelength range (e.g., 380 to 780 nm). Then the ray (122) passes the optical cavity for the second time as described above, and the ray (122) is partially reflected by the beam splitter (141). Subsequently, the ray (122) passes the optical cavity for the third time as described above. During both the second pass and the third pass, the QWP (142) alters the polarization state of the ray (122). Accordingly, the second linear polarization state of the ray (122) is converted to the first linear polarization state that is parallel to a transmission direction of the reflective polarizer (139). Thus, the reflective polarizer (139) transmits the ray (122) having the first linear polarization state such that the ray (122) is directed to the area (151) with a relatively high transmittance that is above or equal to a value (e.g., 90%) over a wavelength range (e.g., 380 to 780 nm).

Referring to FIG. 1, the optical path includes the folded path (125) between the reflective polarizer (139) and the beam splitter (141) due to the polarization change.

To achieve high quality imaging, the reflective polarizer (139) is to have high-quality, such as a high reflectance (e.g., the high average reflectance) in the block direction, a high transmittance (e.g., the high average transmittance) in the pass direction, relatively small surface roughness, and the like. Further, the AR coating can be applied to any suitable surface(s) in the optical system (110) to reduce or eliminate ghosting due to the multi-reflections at various interfaces.

Polarized catadioptric optical systems are emerging solutions for virtual reality HMDs. A good VR optical system can include a large pupil volume (also referred to as an eye box) to accommodate multiple interpupillary distances and to allow for eye rotation as the user scans across the FOV. In an example, the eye box indicates a volume where an eye receives an acceptable view of an image. A size and a location of the eye box can be related to a number of constraints, such as a FOV and image quality. In an example, the eye box indicates a range of eye positions, at an eye relief distance, from which an image produced by the optical system (110) is visible. The eye box can include eye movements, such as eye rotation and/or lateral movement.

An optical power can indicate a degree to which an optical system or an optical component (e.g., a lens or a curved mirror) converges or diverges light. In an example, the optical power of the optical component or system is equal to a reciprocal of a focal length f of the optical component or system. A higher optical power indicates (i) a stronger focusing power for a converging optical component/system or (ii) a stronger diverging power for a diverging optical component/system.

In a polarized catadioptric optical system, such as the display system (100), a folded optical path (e.g., the folded path (125)) can be used to achieve a relatively high optical power with a compact form factor. In the example shown in FIG. 1, the beam splitter (141) is a curved mirror that partially reflects and partially transmits light, and the reflective polarizer (139) can reflect as a planar mirror or transmit light depending on a polarization state of the light. Design freedoms available in a folded optical system (e.g., the optical system (110)) can provide benefits to HMD systems. The benefits can include a high resolution achieved with reflective imaging, a wide FOV (e.g., by using low aberration lenses), a compact size, a decreased weight, an ability to adjust focus, and forming a larger eye box. The FOV can indicate an extent of an observable world that is seen or detected by a light receiver (also referred to as an optical sensor). In an example, the FOV is indicated by a solid angle within which the light detector can detect or receive light. The optical system (110) shown in FIG. 1 can be manufactured, for example, by controlling a curved form and surface finish of the first lens (131) and the second lens (132). A pancake optical system (e.g., the display system (100)) can deliver a comfortable and immersive user experience.

The display system (100) can have a large pupil volume to accommodate multiple interpupillary distances and to allow for eye rotation as a user scans across the FOV. An interpupillary distance (IPD) is a distance between centers of pupils of eyes of a user. IPDs can vary with respect to age, gender, or the like. The display system (100) can be designed by taking IPD variance into account such that the optical system (110) can accommodate various users with different IPDs. In an example, IPDs vary from approximately 50 to 80 mm.

In an example, to allow users to enjoy VR without prescription glasses or with a dynamic focus, the display system (100) can adjust a diopter of a lens in the lens system (130) to match the prescription. In an example, the diopter indicates a virtual object distance. Increasing the diopter can make an object appear closer. The focus accommodation can be achieved by changing an optical power of the optical system. The optical power of a folded mirror cavity (e.g., the optical cavity between the beam splitter (141) and the reflective polarizer (139)) can be changed by varying a cavity length (or a gap) relative to a reference cavity length corresponding to a reference optical power.

Referring back to FIG. 1, the shift block (170) can be coupled to the optical system (110) and optionally the display device (120) to apply suitable spatial pixel shift adjustments to the virtual image 199. The controller (180) can be coupled to the optical system (110) and the shift block (170) to control the operations of the optical system (110) and the shift block (170).

The shift block (170) can apply the spatial pixel shift adjustment mechanically or optically. The shift block (170) can include a mechanical shifter to apply the spatial pixel shift adjustment. In some examples, the mechanical shifter can shift the display device (120) to apply the spatial pixel shift adjustment. In some examples, the mechanical shifter can shift at least one optical element (e.g., the first lens (131) or the second lens (132)) to apply the spatial pixel shift adjustment. A relatively small adjustment to the gap (133) can be amplified, for example, 3 times, due to the folded path (125) in the optical cavity.

The display system (100) can include other suitable mechanical, electrical and optical components. For example, the display system (100) includes a frame (101) that can protect other components of the display system (100). In another example, the display system (100) can include a strap (not shown) to fit the display system (100) on a user's head. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Considering human factors, such as human vision (e.g., a FOV of a human eye, eye rotation), head rotation, and the like may help design optical parameters of the optical system (110). An optical design with a high resolution over a range of eye rotations can make a viewing experience of a user more natural.

Figure 2:
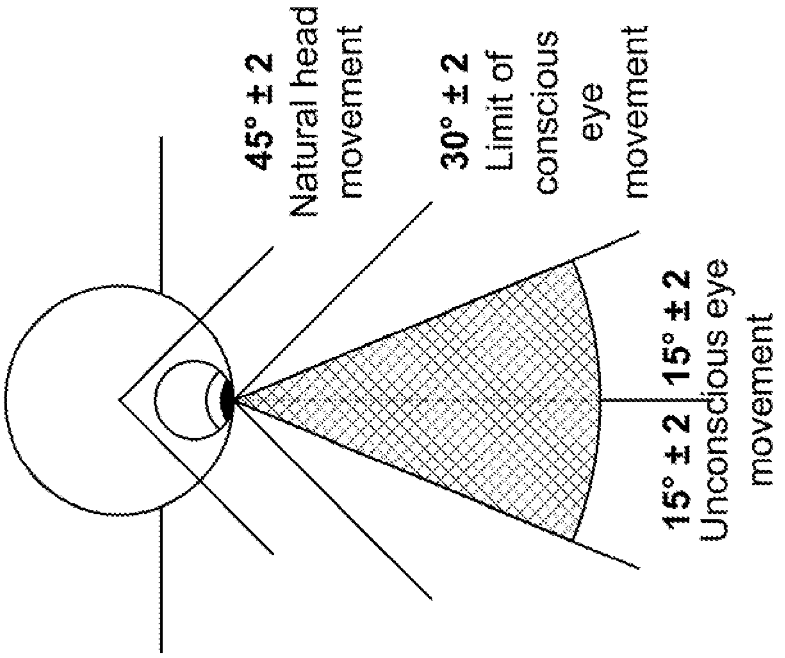
FIG. 2 shows examples of eye rotations and head rotations.

Unconstrained or unconscious eye rotation can be less than 20°. FIG. 2 shows examples of eye rotations and head rotations. A horizontal unconscious eye rotation can be less than a value (e.g., 20°) from a center to a left side or a right side, such as 15°±2°. A horizontal conscious eye rotation can be larger than that of the horizontal unconscious eye rotation. In an example, the horizontal conscious eye rotation is up to a value, such as 30°±2°. In another example, an eye can rotate approximately 28°±8° up, and 47°±8° down. FIG. 2 also shows an example of a natural head movement. In an example, the natural head movement is 45°±2° horizontally.

In an example, humans have a slightly over 210° forward-facing horizontal arc of visual fields without eye movements. A horizontal FOV of both human eyes can be 210°. A vertical range of the visual field (or the vertical FOV) in humans is around 150°.

Figure 3:
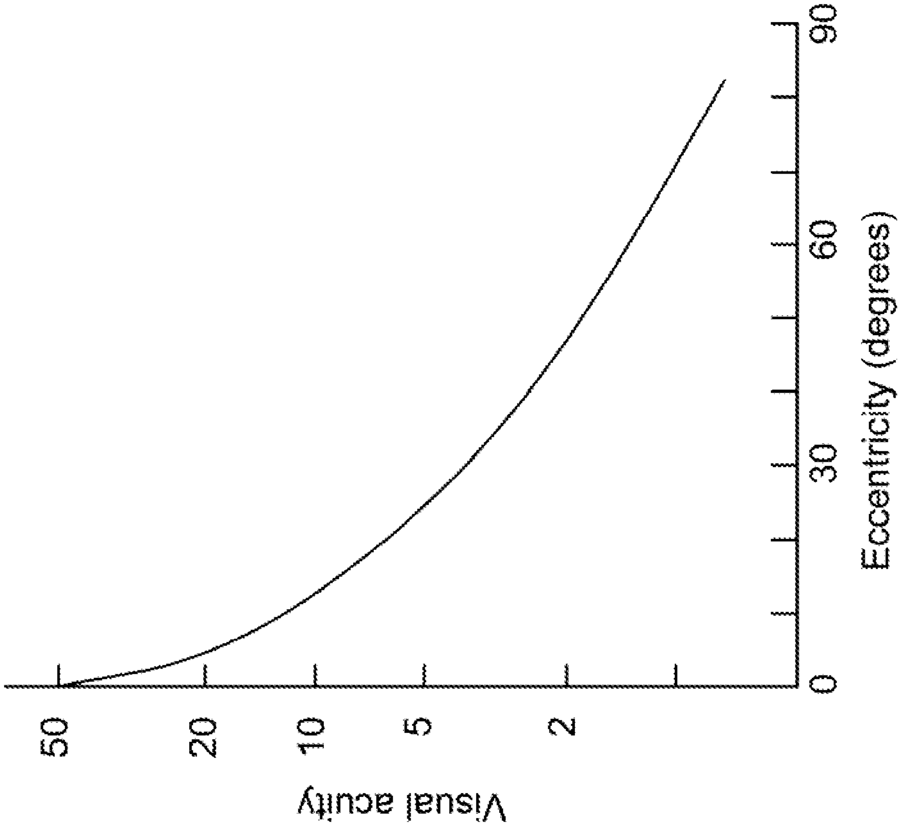
FIG. 3 shows a relationship between visual acuity and eccentricity.

A human eye is not a perfect lens over a large FOV. Visual acuity can indicate clarity or sharpness of vision. An eccentricity can refer to an angular distance from a center of a visual field or from the foveola of a retina. FIG. 3 shows a relationship between visual acuity (including peripheral visual acuity) and eccentricity. The visual acuity can decrease with the eccentricity. Accordingly, a resolution of an optical system in a peripheral field can be lower than a resolution of the optical system in a center field because eyes lack visual acuity in the peripheral field without eye rotation to gaze directly to the peripheral field. Considering visual acuity can avoid overdesign of an optical system.

In some examples, parameters of the display system (100) include a field of view (FOV), an eye relief, a lens track length, a display size, a size of the area (151), and/or the like. The eye relief (e.g., a distance D3) can refer to a distance between a viewing position of a light receiver (e.g., the area (151)) and the lens system (130). In an example, the distance D3 between the area (151) and the last optical component (e.g., the first lens (131)) in the optical system (110) before the area (151) is 15 mm. The lens track length (e.g., a distance D4) can refer to a distance between the display device (120) and the lens system (130). The distance D4 between the display device (120) and the first lens (131) is 18.5 mm. In the example shown in FIG. 1, the distance D4 is measured from the display device (120) to the reflective polarizer (139). In an example, D1 is equal to a sum of D3 and D4. In another example, the distance D4 is measured from the display device (120) to the surface (137). The display size is indicated by a display image circle that is imaged by the optical system (110) onto the area (151), and the display image circle has a radius of 23 mm. The size (e.g., pupil size) of the area (151) can be 5 mm. The FOV of the optical system (110) is 110°. The optical system (110) can form the virtual image (199) from an image on the display device (120) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

Figure 4:
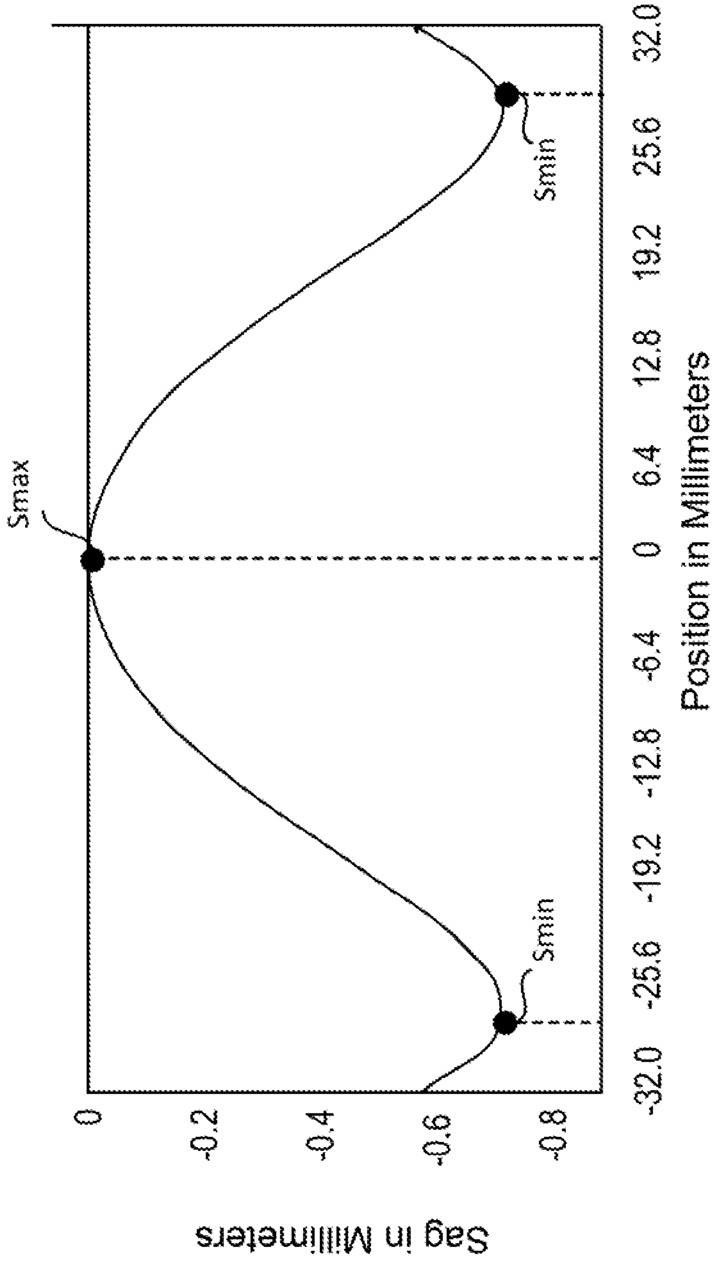
FIG. 4 shows a relationship between a sag (in mm) of a surface and a position along an axis that is perpendicular to an optical axis according to an embodiment of the disclosure.

FIG. 4 shows a shape of the surface (136) according to an embodiment of the disclosure. The shape of the surface (136) can be represented by a sagitta, as described above. FIG. 4 shows a relationship between a sag (in mm) of the surface (136) and a position along an axis (e.g., a Y position along the Y axis) that is perpendicular to the optical axis (160). In an example, the sag indicates a distance along the optical axis (160) between a line (173) and a point on the curve (136) formed by an intersection of the surface (136) of the first lens (131) and the YZ plane. The line (173) passes through a vertex V1 on the surface (136) and is tangential to the surface (136). The position of V1 is at the center of the first lens (131) (e.g., 0 mm), and the sag at V1 is 0 mm. A shape of the surface (136) can also be indicated by a maximum sagitta difference of the surface (136). The maximum sagitta difference can be a difference between (i) a minimum sagitta $S_{min}$ (e.g., at about 27 mm or −27 mm) of the surface (136) and (ii) a maximum sagitta $S_{max}$ (e.g., at 0 mm) of the surface (136) is approximately 0.7 mm. The shape of the surface (136) can be indicated by a maximum absolute sagitta of the surface (136). The maximum absolute sagitta of the surface (136) can be an absolute value of the minimum sagitta $S_{min}$ (e.g., at about 27 mm or −27 mm) of the surface (136), which is identical to the maximum sagitta difference. The shape of the reflective polarizer (139) can match (e.g., conform to) the shape of the surface (136). In an example, the shape of the reflective polarizer (139) is also indicated by the shape of the surface (136) shown in FIG. 4.

The RP lens (140) including the first lens (131) and the reflective polarizer (139) can be fabricated using a fabrication process (500) shown in FIGS. 5A-5D. FIGS. 5A-5D show the fabrication process (500) according to an embodiment of the disclosure. The fabrication process (500) is described using the RP lens (140) as an example. The fabrication process (500) can include a co-mold process to fabricate two optical components, for example, simultaneously. The two optical components fabricated by the fabrication process (500) can include a lens (e.g., (131) or (132)) and a thin-film optical component (e.g., (139), (141), (142)).

Figure 5A:
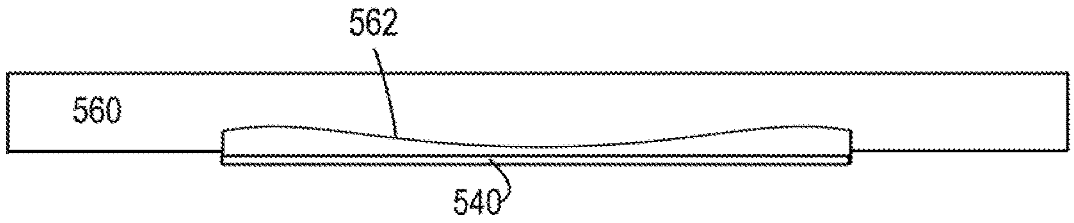
FIGS. 5A-5D show a fabrication process according to an embodiment of the disclosure.

The fabrication process (500) starts at a step (S501). Referring to FIG. 5A, a first mold (560) including a first mold surface (562) can be formed at the step (S501). The first mold surface (562) can be curved based on the surface (136) of the first lens (131). A surface profile of the first mold surface (562) can be identical or similar to a surface profile of the surface (136) of the first lens (131). The fabrication process (500) proceeds to a step (S510).

Figure 5B:
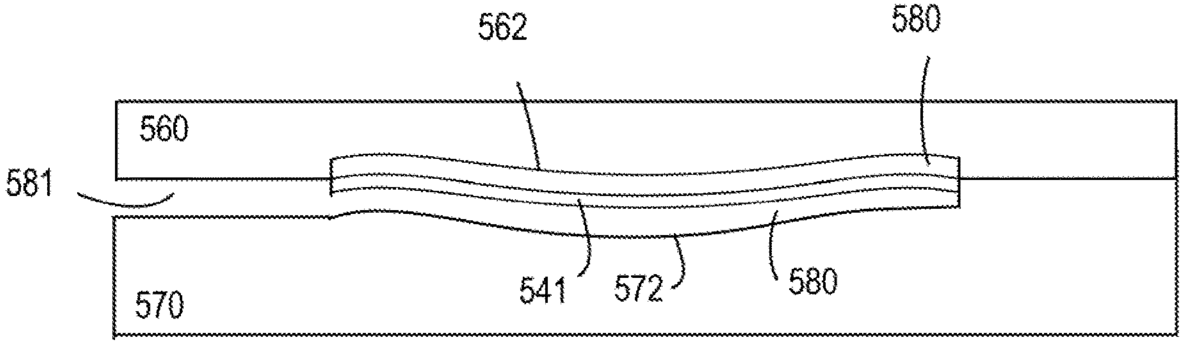
Figure 5C:
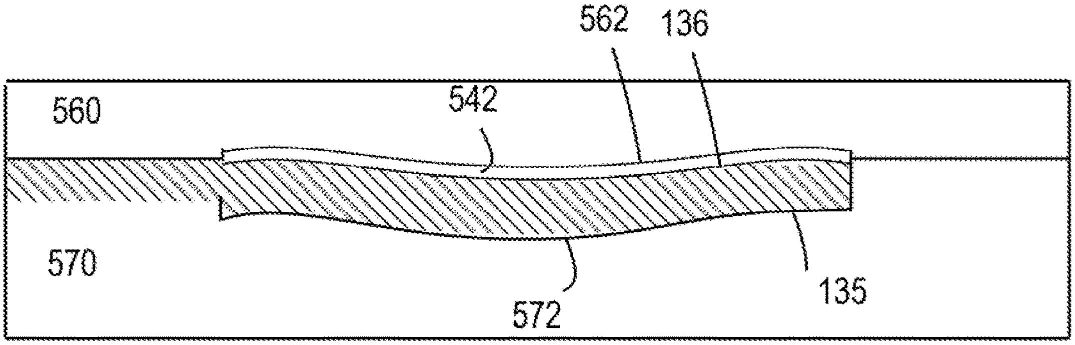
Figure 5D:
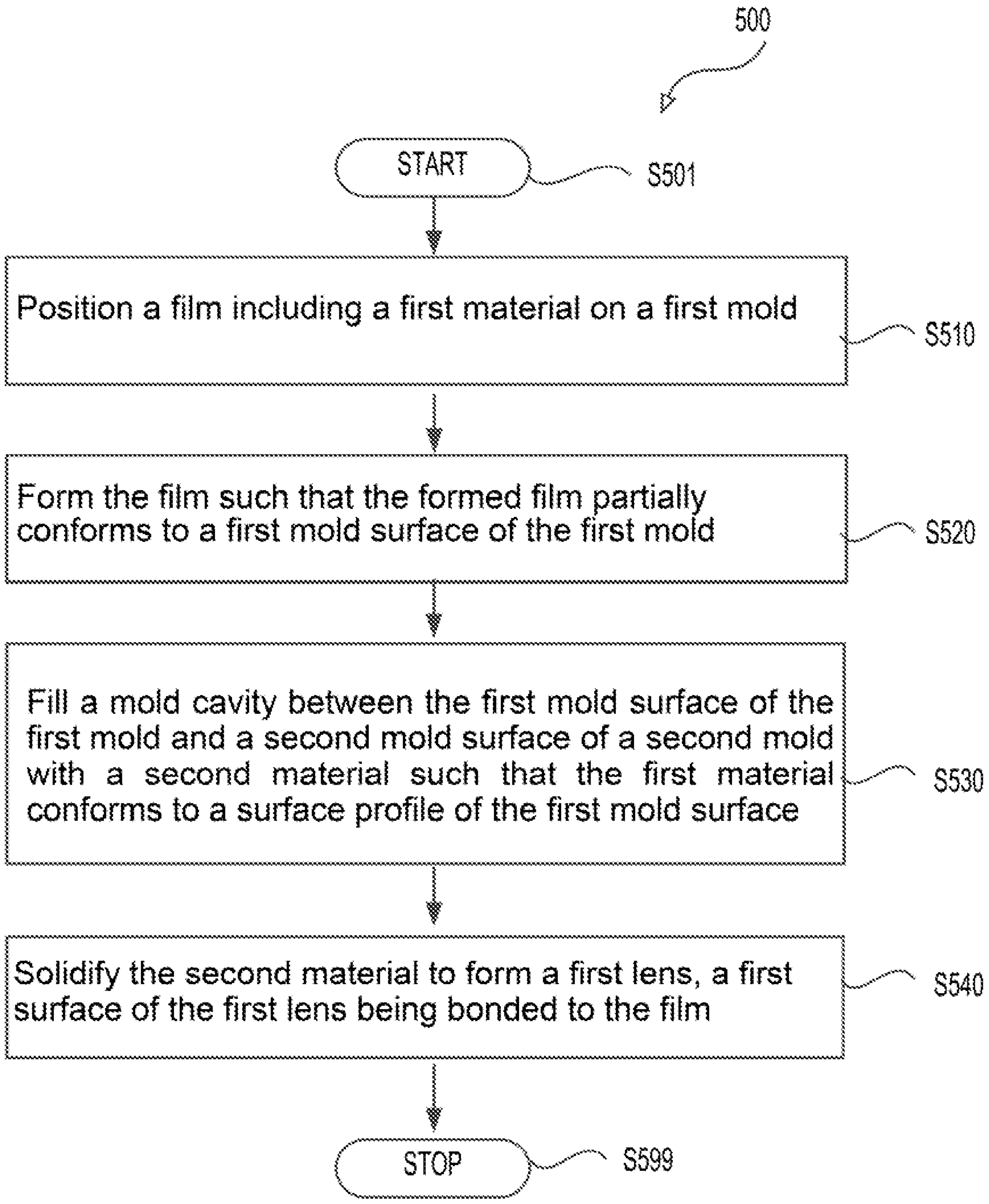

Referring to FIGS. 5A and 5D, at the step (S510), a film (540) including a first material (e.g., the RP material) can be positioned on the first mold (560). The film (540) can include one or more layers of optical films. A thickness of the film (540) can be less than a thickness threshold, such as 500 microns, 200 microns, 100 microns, or the like. In an example, the thickness of the film (540) ranges from 20 microns to 100 microns. The film (540) positioned on the first mold (560) can be flat.

Referring to FIGS. 5B and 5D, at the step (S520), the film (540) can be formed (e.g., preformed prior to filling a mold cavity), for example mechanically or thermally, such that the preformed film (541) can partially conform to the first mold surface (562) of the first mold (560). The preformed film (541) can be curved. An absolute value of a curvature of the preformed film (541) is larger than an absolute value of a curvature of the film (540).

In an example, a mold cavity (580) is formed between the first mold surface (562) of the first mold (560) and a second mold surface (572) of a second mold (570). A gate (581) can be connected to the mold cavity (580).

Referring to FIGS. 5C and 5D, at the step (S530), the mold cavity (580) can be filled with a second material, for example, via the gate (581) such that the first material in the preformed film (541) conforms to the surface profile of the first mold surface (562). The second material that is filled into the mold cavity (580) can be flowable, such as a molten resin. The film (542) can refer to a film including the first material that conforms to the surface profile of the first mold surface (562). The film (542) can have an identical profile as the surface profile of the first mold surface (562).

Referring to FIGS. 1, 5C, and 5D, at the step (S540), the first lens (131) can be formed based on the solidified and/or cooled second material. The surface (136) of the first lens (131) can be bonded to the film (542). The surface (136) of the first lens (131) can conform to the profile of the film (542), which can be identical to the surface profile of the first mold surface (562). The surface (135) of the first lens (131) can conform to a surface profile of the second mold surface (572). The fabrication process (500) can proceed to a step (S599), and terminates.

Figure 6A:
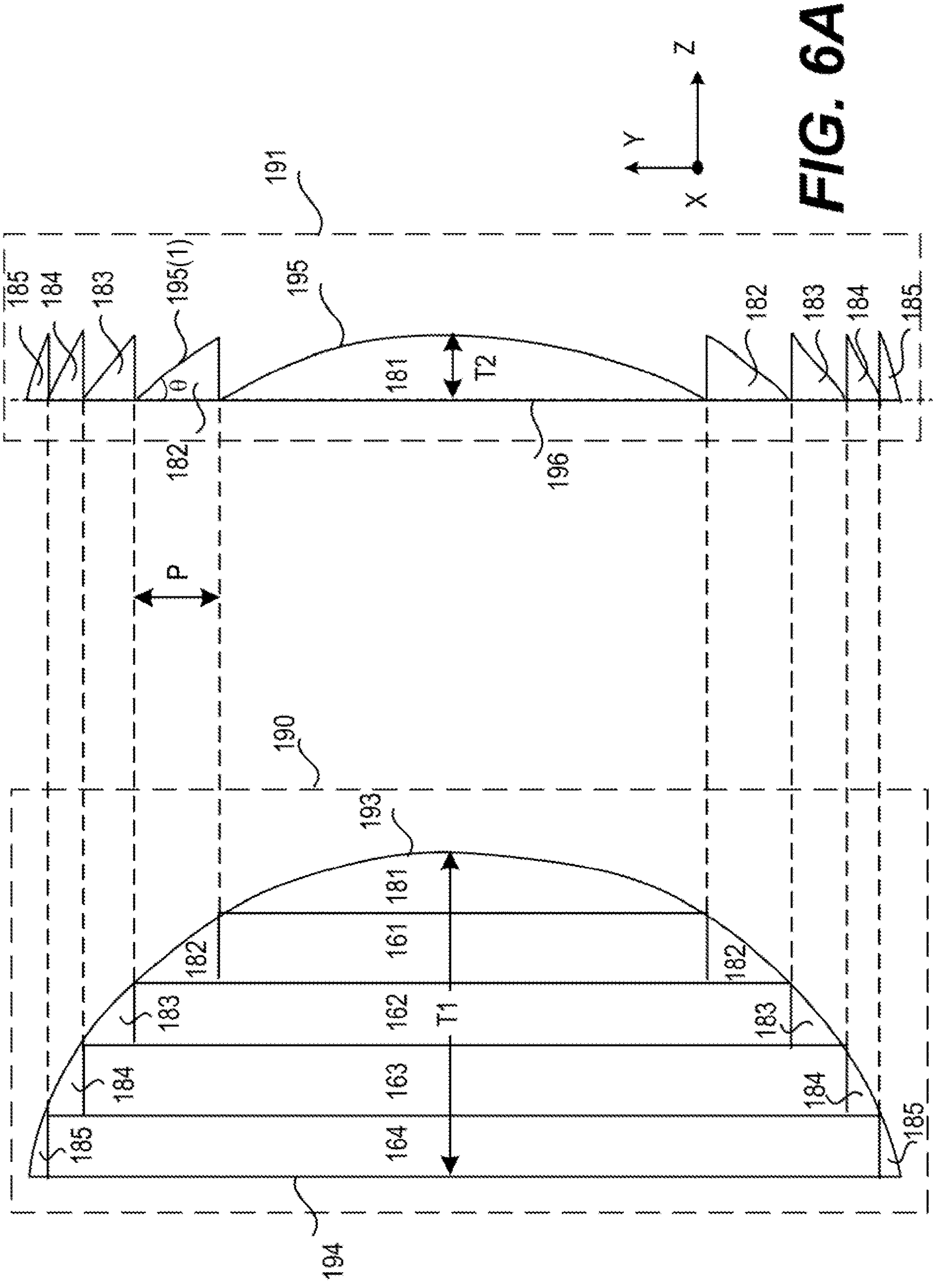
FIG. 6A shows a lens and a corresponding Fresnel lens according to an embodiment of the disclosure.
Figure 6B:
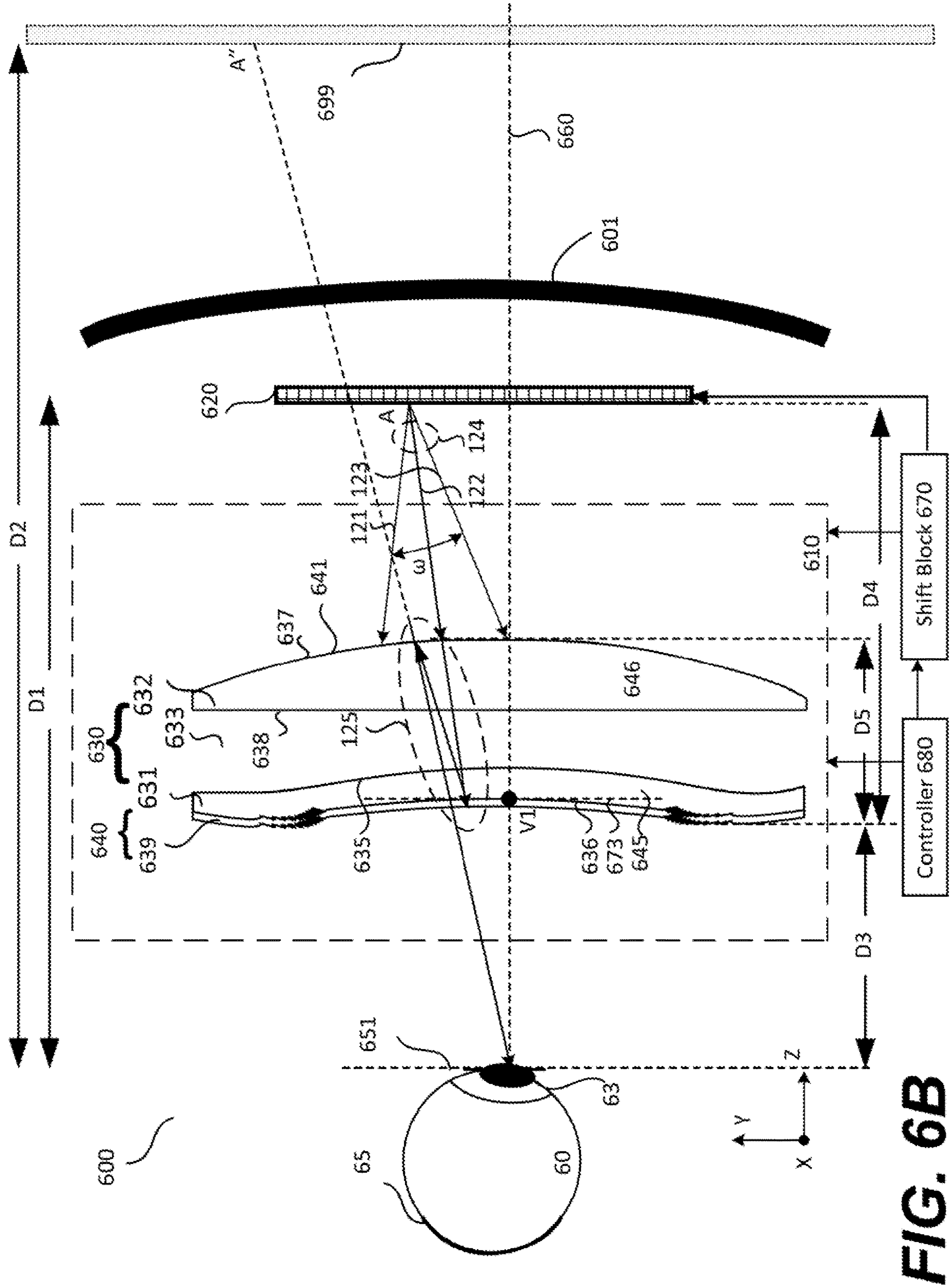
FIG. 6B shows a display system (e.g., a near eye display system) in a side view according to some embodiments of the disclosure.
Figure 8A:
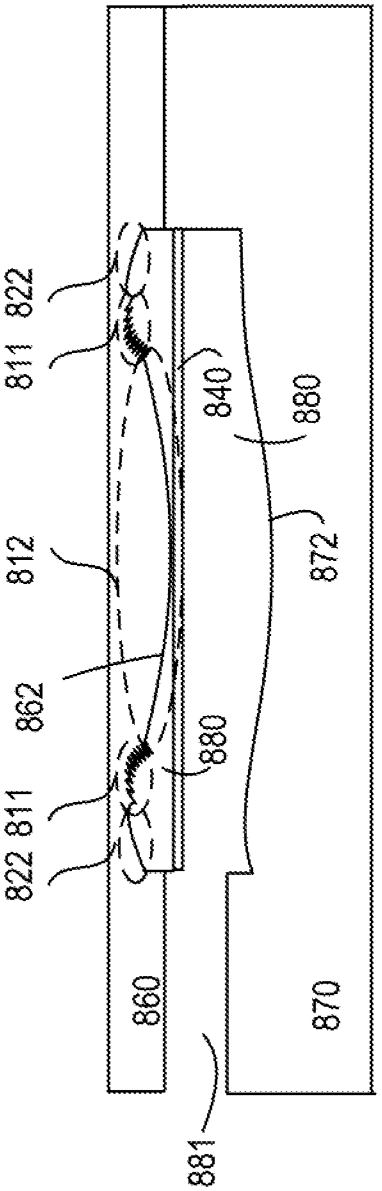
FIGS. 8A-8C show a fabrication process according to an embodiment of the disclosure.
Figure 8B:
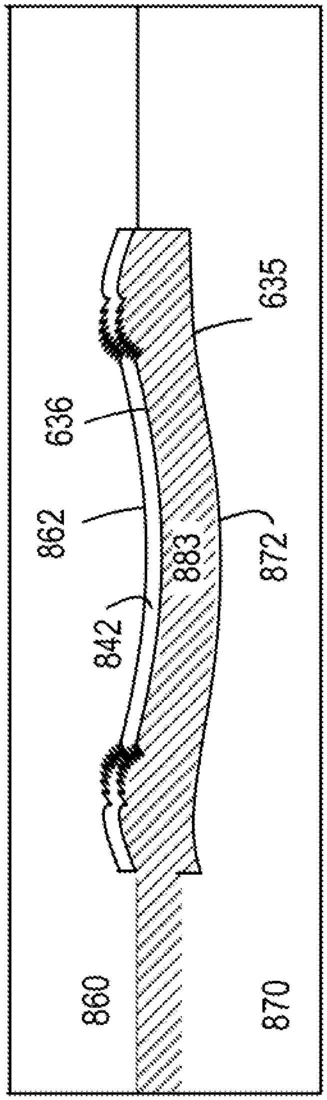
Figure 8C:
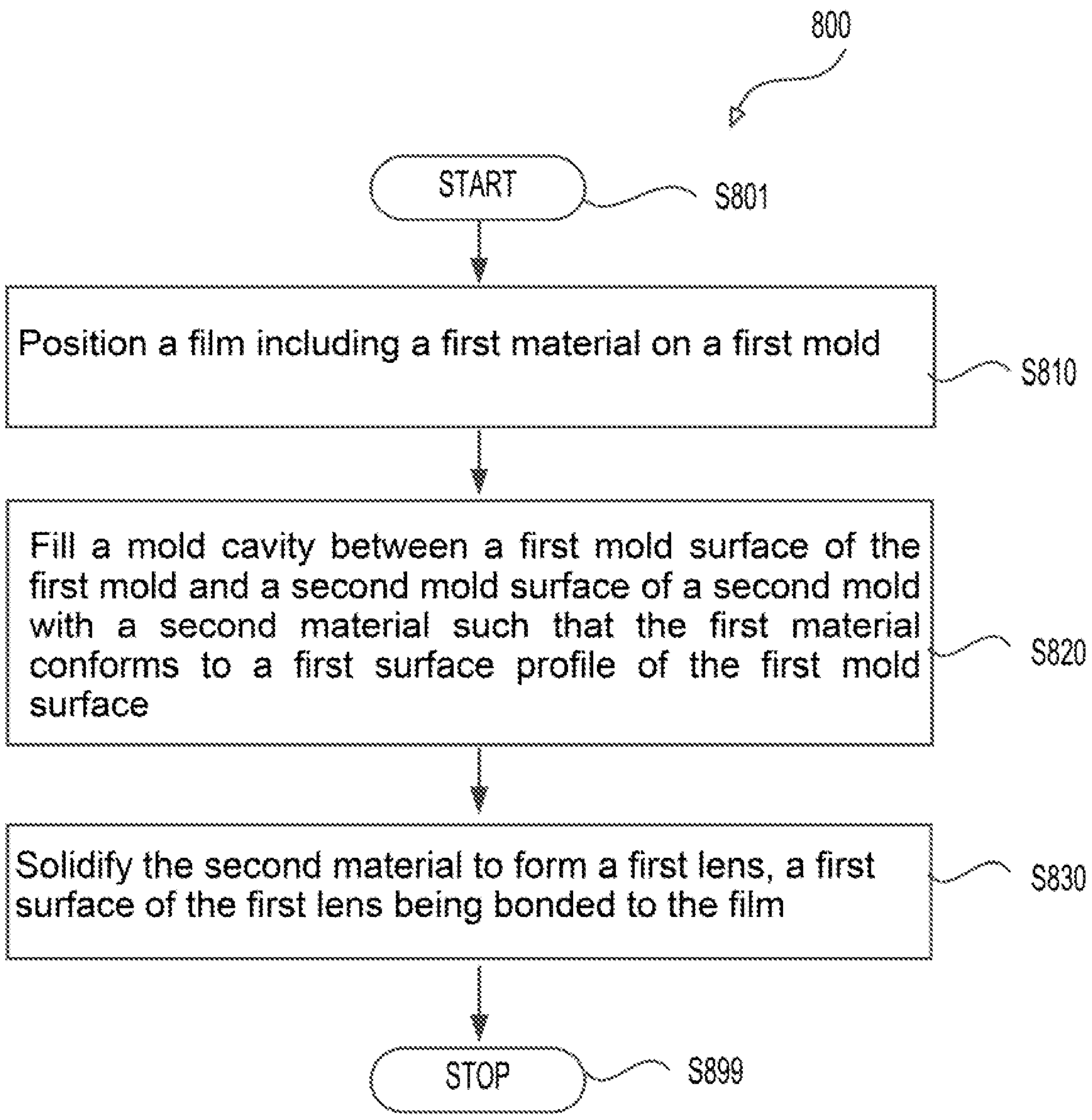

According to an embodiment of the disclosure, the step (S520) can be omitted, and thus the film (540) does not need to be preformed to conform to the first mold surface (562), when the first lens (131) is modified into a Fresnel lens that includes a Fresnel structure, such as described in FIGS. 6B and 8C.

FIG. 6A shows a lens (190) and a corresponding Fresnel lens (191) according to an embodiment of the disclosure. The lens (190) includes an optical transparent member between surfaces (193)-(194). The lens (190) has a largest thickness T1, for example, at a center of the lens (190). The Fresnel lens (191) can include an optical transparent member between surfaces (195)-(196). A surface curvature of the smooth surface (193) of the lens (190) can be preserved by the grooved surface (e.g., the discontinuous surface) (195) of the Fresnel lens (191), and thus the Fresnel lens (191) can have a same or substantially identical focal length as that of the lens (190). For example, the smooth surface (193) of the lens (190) are divided into smaller concentric portions (181)-(185), and the portions (181)-(185) are shifted along an optical axis (e.g., parallel to the Z axis in FIG. 6A) of the lens (190) to form the Fresnel lens (191). In an example, shapes of the portions (181)-(185) in the lens (190) are identical or substantially identical to respective shapes of the portions (181)-(185) in the Fresnel lens (191).

The portions (181)-(185) of the Fresnel lens (191) correspond to the portions (181)-(185) of the lens (190), for example, the portions (181)-(185) of the Fresnel lens (191) have identical shapes and materials as those of the portions (181)-(185) of the lens (190). To illustrate the relationship between the lens (190) and the Fresnel lens (191), portions (161)-(164) of the lens (190) can be considered as removed, and the remaining portions (181)-(185) of the lens (190) can be considered as realigned or shifted to the surface (196) (e.g., parallel to the XY plane). The lens (190) can be considered as collapsed into the Fresnel lens (191) while preserving the surface curvature of the surface (193), and thus preserving the optical power of the lens (190). The smooth surface (193) can become a grooved surface (195) with discontinuities between the adjacent portions (181)-(185). A largest thickness T2, for example, at a center of the Fresnel lens (191) is less than the thickness T1 at the center of the lens (190). Various methods can be applied to manufacture the Fresnel lens (191).

In some embodiments, a surface of the portion (e.g., the center portion) (181) of the Fresnel lens (191) is continuous or smooth and does not include a Fresnel structure. A surface of a peripheral portion (e.g., including the portions (182)-(185)) of the Fresnel lens (191) that surrounds the center portion (181) can be discontinuous or grooved and can include the Fresnel structure. A size of the center portion (181) without a Fresnel structure and a size of the peripheral portion including the Fresnel structure can be chosen, for example, based on design requirements.

Referring to FIG. 6A, the Fresnel structure can include a plurality of grooves (e.g., prisms) such as the portions (182)-(185). In an example, the portions (182)-(185) are concentric grooves. A pitch (or a prism pitch) P can represent a spacing between adjacent prisms. The pitch P can be non-uniform (such as shown in FIG. 6A) or uniform. A slope angle θ can represent an angle between the surface (196) and a respective portion (e.g., (195(1)) of the surface (195). Parameters of the Fresnel lens (191) including but not limited to a size of the pitch P, a distribution of the pitch P across the Fresnel structure, and the slope angles θ can be determined, for example, based on design requirements.

In some examples, size(s) of respective center portion(s) of a Fresnel lens, such as the size of the center portion (181), are less than a threshold, for example, the size of the center portion (181) is comparable or identical to the pitch of another groove (e.g., (182)), the plurality of grooves can include the center portion(s) (e.g., (181)), and the Fresnel structure can include the entire Fresnel lens.

FIG. 6B shows a display system (e.g., a near eye display system) (600) in a side view according to some embodiments of the disclosure. The display system (600) includes an optical system (610), a display device (620), a shift block (670), a controller (680), and/or the like. The optical system (610) can include a lens system (630), a BS (641), a reflective polarizer (639), and/or the like. In an example, the optical system (610) includes a waveplate, such as a QWP (642). The optical system (610) can direct emitted light beams from the display device (620) or a real object to an area or a viewing area (651). In an example, the area (651) is located in an XY plane. In an example, the area (651) is referred to as an exit pupil of the display system (600). The XY plane includes an X axis and the Y axis that is orthogonal to the X axis. A light receiver or detector, such as an eye (60) of a user or the like, can be located at the area (651). In an example, a lens (63) in the eye (60) forms an image on a retina (65) of the eye (60), and thus the eye (60) perceives an image on the display device (620) as a virtual image, such as a virtual image (699) in FIG. 6B. The virtual image (699) appears at a distance D2 from the area (651) and appears larger than the image on the display device (620). The distance D2 is larger, and in some cases much larger, than a distance D1 between the area (651) and the display device (620).

The lens system (630) can include one or more lenses, such as a first lens (631) and a second lens (632). The first lens (631) can include an optically transparent member (645) having two opposite surfaces (635)-(636). The second lens (632) can include an optically transparent member (646) having two opposite surfaces (637)-(638). An optical axis (660) of the lens system (630) can be parallel to a Z axis that is perpendicular to the XY plane. The first lens (631) and the second lens (632) can be separated by a gap (633).

Surfaces (e.g., (635)-(638)) of lenses of the lens system (630) can have any suitable shapes, such as planar shape(s) parallel to an XY plane, spheric shape(s) with any suitable radius of curvature (e.g., a smooth spheric shape or a grooved spheric shape with a Fresnel structure), aspheric shape(s) (e.g., a smooth aspheric shape or a grooved aspheric shape with a Fresnel structure), or other shape(s). As described above, each shape can be a smooth shape or a grooved shape (e.g., a shape including a Fresnel structure).

Similar as described in FIG. 1, the reflective polarizer (639) can be configured to pass through a light beam having a first linear polarization state and reflect the light beam having a second linear polarization state. The second linear polarization state is orthogonal to the first linear polarization state. The reflective polarizer (639) can be formed on a surface (e.g., (636)) in the lens system (630). The reflective polarizer (639) can be a thin-film optical component including a thin film, for example, including one or more layers of optical films. A thickness of the reflective polarizer (639) can be less than the RP thickness threshold, such as 500 microns, 200 microns, 100 microns, or the like. The reflective polarizer (639) can be disposed onto the surface (636) of the first lens (631). A shape of the reflective polarizer (639) can conform substantially or completely to a shape (e.g., a planar shape, a spheric shape, an aspheric shape, or the like) of the surface (636) of the first lens (631). In the example shown in FIG. 6B, the surface (636) of the first lens (631) is aspheric, and thus a shape of the reflective polarizer (639) is aspheric. The first lens (631) can be an aspheric-aspheric lens. In an example, an RP lens (640) includes the first lens (631) and the reflective polarizer (639).

The RP lens (640), the lens system (630), the optical system (610), and the display system (600) in FIG. 6B can be related to the RP lens (140), the lens system (130), the optical system (110), and the display system (100) in FIG. 1, respectively.

Figure 6C:
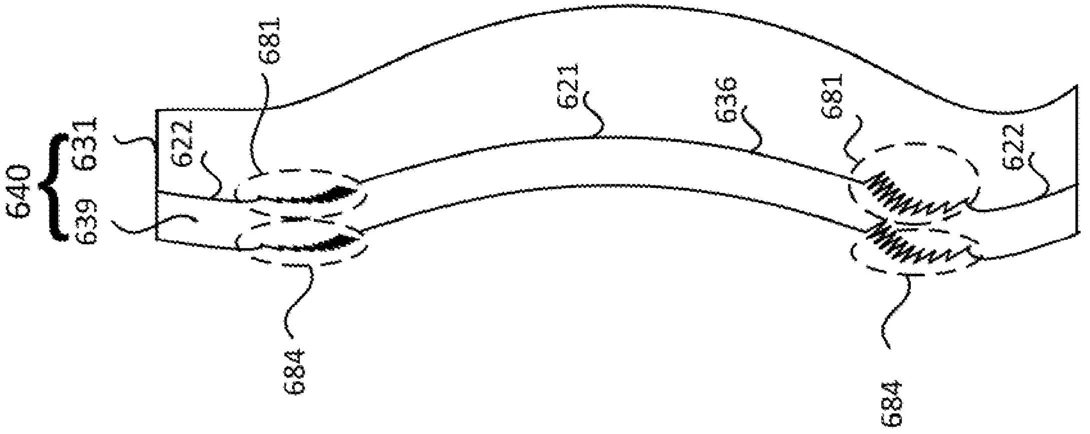
FIG. 6C shows a lens and a reflective polarizer in a side view according to some embodiments of the disclosure.

FIG. 6C shows the RP lens (640) according to an embodiment of the disclosure. According to an embodiment in the disclosure, the first lens (631) can be a variation of the first lens (131), the reflective polarizer (639) can be a variation of the reflective polarizer (139), and the RP lens (640) can be a variation of the RP lens (140). The first lens (631) can be a Fresnel lens. Referring to FIG. 6C, the surface (136) of the first lens (631) can include a Fresnel structure (681). In an example, the surface curvature of the surface (136) of the first lens (131) in FIG. 1 is preserved by the grooved surface (636) of the first lens (631) such that the first lens (631) can have a same or similar focal length as that of the first lens (131). A center region (621) of the surface (636) can be smooth and does not include a Fresnel structure, and the Fresnel structure (681) can surround the center region (621). In an example, the surface (636) includes a region (622) that is smooth and does not include a Fresnel structure, and the region (622) surrounds the Fresnel structure (681).

The reflective polarizer (639) can be a variation of the reflective polarizer (139). The reflective polarizer (639) can include a Fresnel structure that is identical to the Fresnel structure (681). For example, both surfaces of the reflective polarizer (639) include the Fresnel structure (e.g., indicated by (681) and (684)). A center region of the reflective polarizer (639) can be smooth and does not include a Fresnel structure, and the Fresnel structure (e.g., indicated by (681) and (684)) can surround the center region of the reflective polarizer (639). In an example, an edge region of the reflective polarizer (639) that is smooth and does not include a Fresnel structure surrounds the Fresnel structure (e.g., indicated by (681) and (684)) of the reflective polarizer (639).

Referring to FIGS. 1 and 6B, the reflective polarizer (139) can be modified as the reflective polarizer (639) that includes the Fresnel structure, and the first lens (131) can be modified as the first lens (631) that includes the Fresnel structure (681). Thus, the RP lens (140) can be modified as the RP lens (640).

Components labeled with 6xx (e.g., xx being 32, 41, 42, 20, 51, 01, 99, 80, 70) in the display system (600) other than the RP lens (640), the first lens (631), and the reflective polarizer (639) can be identical or similar to corresponding components labeled with 1xx in the display system (100). For example, the second lens (632) (e.g., xx being 32) is identical to the second lens (132). Thus, the optical system (110) and the display system (100) can be modified as the optical system (610) and the display system (600), respectively, for example, by modifying the RP lens (140) into the Fresnel RP lens (640).

The description of the optically transparent members (145)-(146), the surface (135), the surface (137), the surface (138), the beam splitter (141), the QWP (142), the display device (120), the area (151), the controller (180), and the shift block (170) in FIG. 1 can be applied to the optically transparent members (645)-(646), the surface (635), the surface (637), the surface (638), the beam splitter (641), the QWP (642), the display device (620), the area (651), the controller (680), and the shift block (670) in FIG. 6B, respectively. The light rays (121)-(123), the subset (124) of the light rays, and the folded path (125) in FIG. 6B are described in FIG. 1. The distances D1-D5 in FIG. 6B are described in FIG. 1.

A lens can include a center region and at least one peripheral region that surrounds the center region. The center region of the lens can be used for high resolution and low ghost viewing/imaging, and viewing/imaging through the at least one peripheral region of the lens can have a low resolution. A Fresnel structure (e.g., including a plurality of grooves) can cause diffraction artifacts, and thus viewing and/or imaging via a region including a Fresnel structure may deteriorate the resolution. In some examples, it is less desirable to incorporate a Fresnel feature into a lens area (e.g., a center region of the lens) used for a high resolution and low ghost optical (viewing/imaging) path. In various embodiments, a good optical viewing area can be within an FOV threshold, such as 70° on axis view. Thus, a Fresnel structure can be included outside the FOV threshold (e.g., an FOV of 70°), for example, to ensure that the Fresnel structure only affects a low resolution far-field peripheral vision.

Referring to FIG. 6C, the center region (621) of the first lens (631) within the FOV threshold (e.g., an FOV of 70°) does not include a Fresnel structure. The Fresnel structure (681) that surrounds the center region (621) can be disposed outside the FOV threshold. A size (e.g., a diameter) of the center region (621) can depend on the FOV threshold (e.g., 70°). In an example, the size of the center region (621) depends on the FOV threshold (e.g., 70°) and the distance D3 (or the eye relief). The size of the center region (621) can increase with the FOV threshold (e.g., 70°) and the distance D3 (or the eye relief).

In an example, system parameters of the display system (600) are identical or similar to those of the display system (100). The distance D3 (or the eye relief) between the area (651) and the last optical component (e.g., the first lens (631)) in the optical system (610) before the area (651) is 15 mm. The distance D4 (i.e., the lens track length) between the display device (620) and the first lens (631) is 18.5 mm. In the example shown in FIG. 6B, the distance D4 is measured from the display device (620) to the reflective polarizer (639). In another example, the distance D4 is measured from the display device (620) to the surface (637). The display size is indicated by a display image circle that is imaged by the optical system (610) onto the area (651), and the display image circle has a radius of 23 mm. A size (e.g., pupil size) of the area (651) can be 5 mm. A FOV of the optical system (610) is 110°. The optical system (610) can form the virtual image (699) from an image on the display device (620) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

Figure 7:
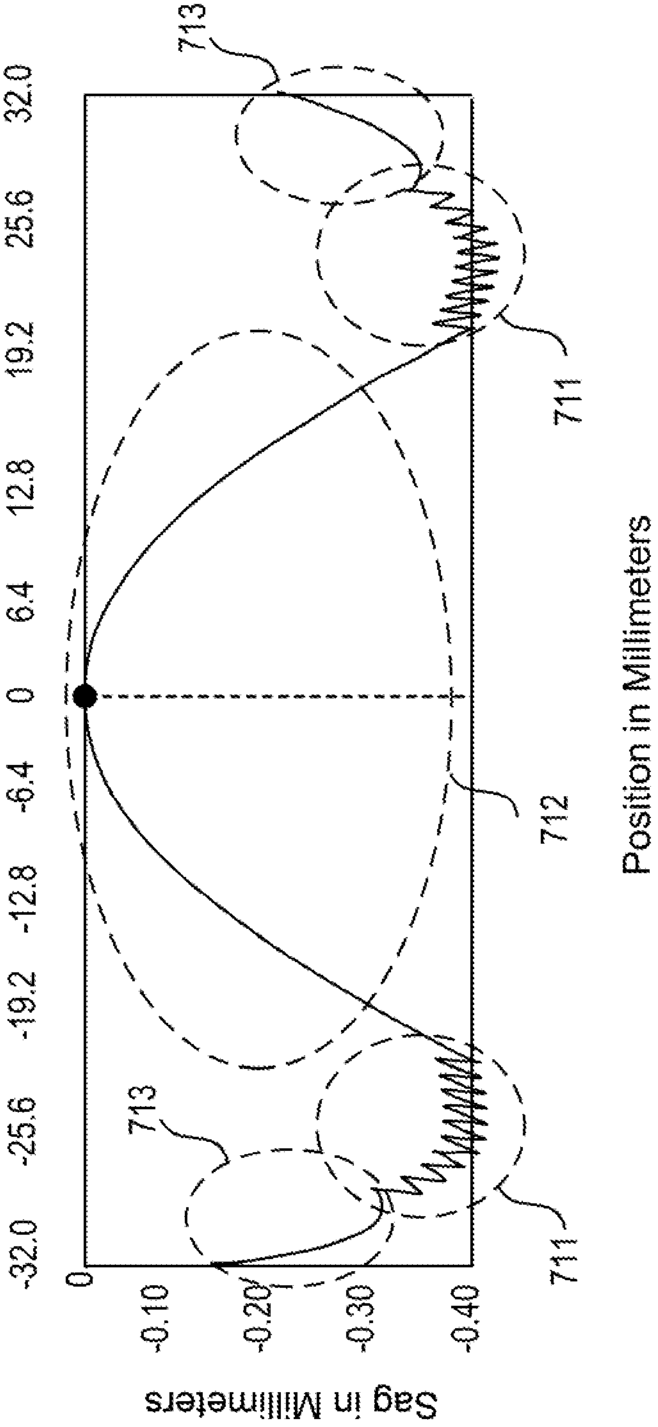
FIG. 7 shows a relationship between a sag (in mm) of a surface and a position along an axis that is perpendicular to an optical axis according to an embodiment of the disclosure.

FIG. 7 show a shape of the surface (636) according to an embodiment of the disclosure. The shape of the surface (636) can be represented by a sagitta, such as a relationship between the sag (in mm) of the surface (636) and a position along an axis (e.g., a Y position along the Y axis) that is perpendicular to the optical axis (660). In an example, the sag indicates a distance along the optical axis (660) between a line (673) and a point on the curve (636) formed by an intersection of the surface (636) of the first lens (631) and the YZ plane. The line (673) passes through a vertex V1 on the surface (636) and is tangential to the surface (636). The position of V1 is at the center of the first lens (631) (e.g., 0 mm), and the sag at V1 is 0 mm. A shape of the surface (636) can be indicated by a maximum sagitta difference of the surface (636). The maximum sagitta difference of the surface (636) can be a sagitta difference between (i) a minimum sagitta $S_{min}$ (e.g., at about 24 mm or −24 mm) of the surface (636) and (ii) a maximum sagitta $S_{max}$ (e.g., at 0 mm) of the surface (636) is approximately 0.4 mm. A maximum absolute sagitta of the surface (636) can be identical to the maximum sagitta difference. The shape of the reflective polarizer (639) can match (e.g., conform to) the shape of the surface (636). In an example, the shape of the reflective polarizer (639) is also indicated by the shape of the surface (636) shown in FIG. 7. The Fresnel structure (681) in FIG. 6C corresponds to a region (711) in FIG. 7. The center region (621) without a Fresnel structure corresponds to a region (712) in FIG. 7. The region (622) without a Fresnel structure corresponds to a region (713) in FIG. 7.

As seen from FIGS. 6B, 6C, and 7, incorporating a Fresnel structure into the RP lens (640) (e.g., the first lens (631) and the reflective polarizer (639)) can flatten the RP lens (640). The grooved RP surface (636) of the Fresnel lens (631) can be flatter than the RP surface (136) of the first lens (131). A sag (e.g., the maximum sagitta difference of about 0.4 mm in FIG. 7) of the RP surface (636) of the Fresnel lens (631) onto which the reflective polarizer (639) is disposed can be smaller than a sag (e.g., the maximum sagitta difference of about 0.7 mm in FIG. 4) of the RP surface (136) of the first lens (131) without a Fresnel structure. The Fresnel lens (631) can be thinner or flatter than the corresponding first lens (131).

As described above, the Fresnel RP lens (640) can be fabricated more advantageously than the RP lens (140). When the co-mold process is used to fabricate the Fresnel RP lens (640), a forming step (or a preforming step) can be skipped because the surface (636) of the first lens (631) is flatter or has a smaller sag than that of the RP surface (136) of the first lens (631). For example, the sag (e.g., the maximum sagitta difference of about 0.4 mm in FIG. 7) of the RP surface (636) of the first lens (631) is less than the sagitta threshold (e.g., 0.6 mm), and the RP surface (636) of the first lens (631) is substantially flat. A sag of a first mold surface of a first mold used to fabricate the first lens (631) can be less than the sagitta threshold (e.g., 0.6 mm), such as substantially flat. Further, the grooved Fresnel structure (e.g., the Fresnel groove structure including the plurality of grooves) in the first mold surface may help to bleed air in a manufacturing process (e.g., the co-mold process) to reduce lens defects. Otherwise, without the plurality of grooves in the Fresnel structure, defects can occur, for example, due to air bubbles trapped between the smooth RP film and a smooth mold insert (e.g., the first mold surface).

The RP lens (640) including the first lens (631) and the reflective polarizer (639) can be fabricated using a fabrication process (800) shown in FIGS. 8A-8C. FIGS. 8A-8C show the fabrication process (800) according to an embodiment of the disclosure. The fabrication process (800) is described using the RP lens (640) as an example. The fabrication process (800) can include a co-mold process to fabricate two optical components, for example, simultaneously. The two optical components fabricated by the fabrication process (800) can include a first optical component such as a lens (e.g., (631) or (632)) and a second optical component such as a thin-film optical component (e.g., (639), (641), or (642)).

The fabrication process (800) starts at a step (S801). Referring to FIG. 8A, a first mold (860) including a first mold surface (862) can be formed at the step (S801). The first mold surface (862) can be formed (or curved) based on the surface (636) of the first lens (631). A surface profile of the first mold surface (862) can be identical to a surface profile of the surface (636) of the first lens (631), such as described in FIGS. 6B, 6C, and 7. The first mold surface (862) of the first mold (860) includes a center region (812) that is smooth and a Fresnel structure (811) that surrounds or is otherwise outside the center region (812). In an example, the first mold surface (862) includes a region (822) that surrounds the Fresnel structure (811). Profiles of the center region (812), the Fresnel structure (811), and the region (822) of the first mold surface (862) can be identical to profiles of the center region (621), the Fresnel structure (681), and the region (622) of the surface (636), respectively. Referring to FIG. 7, a maximum sagitta difference of the first mold surface (862) can be identical to the maximum sagitta difference of the surface (636), and can be less than the sagitta threshold (e.g., 0.6 mm). The fabrication process (800) proceeds to a step (S810).

Referring to FIGS. 8A and 8C, at the step (S810), a film (840) including a first material (e.g., the RP material) can be positioned on the first mold (860). For example, the first material may be positioned over the cavity in the first mold (860). The film (840) can include one or more layers of optical films. The film (840) can be pinned to the first mold (860), for example, by statically clinging or stably laying onto the first mold (860) (e.g., over the first mold surface) such that the film (840) does not shift, for example, to a second mold surface (872) of a second mold (870) during the fabrication process (800).

A thickness of the film (840) can be less than a thickness threshold (e.g., the RP thickness threshold), such as 500 microns, 200 microns, 100 microns, or the like. In an example, the thickness of the film (840) ranges from 20 microns to 100 microns. The film (840) positioned on the first mold (860) can be flat, for example, a curvature of the film (840) that is positioned on the first mold (860) is flat (e.g., is 0 or is substantially 0, such as less than 0.01).

Referring to FIG. 8A, the second mold (870) can be disposed opposite to the first mold (860), and a mold cavity (880) can be formed between the first mold surface (862) of the first mold (860) and the second mold surface (872) of the second mold (870). A gate (881) can be connected to the mold cavity (880).

In an example, the film (840) is positioned on the first mold (860). Subsequently, the second mold (870) is disposed opposite to the first mold (860), and thus forming the mold cavity (880) after the film (840) is positioned on the first mold (860).

In an example, the second mold (870) is disposed opposite to the first mold (860), and the mold cavity (880) is formed with the first mold and the second mold. Subsequently, the film (840) is positioned on the first mold (860), for example, above the first mold surface (862) or over a cavity of the first mold (860).

Referring to FIGS. 8B and 8C, at the step (S820), the mold cavity (880) can be filled with a second material (883), for example, via the gate (881) such that the first material in the film (840) conforms to the surface profile of the first mold surface (862). For example, a molten resin including the second material (883) is injected into the mold cavity (880). The molten resin can compress the film (840) against the first mold surface (862) (e.g., also referred to as a Fresnel structured insert) to replicate the surface profile of the first mold surface (862) with a high fidelity, for example, the shape of the film (840) becomes conformed substantially or completely to the surface profile of the first mold surface (862). The fabrication process (800) can be referred to as an injection molding process.

The second material that is filled into the mold cavity (880) can be flowable, such as a molten resin. The film (842) can refer to a film including the first material that conforms to the surface profile of the first mold surface (862). The film (842) can have an identical or similar profile as the surface profile of the first mold surface (862).

Referring to FIGS. 1, 8B, and 8C, at the step (S830), the first lens (631) can be formed with the solidified second material (883). The solidified and/or cooled down resin (or the second material) (883) can adhere (e.g., is bonded) to the film (842), for example, due to chemical compatibility and/or diffusing bonding during the high temperature molding process. The surface (636) of the first lens (631) can be attached (or bonded) to the film (842). The surface (636) of the first lens (631) can conform to the profile of the film (842), which can be identical to the surface profile of the first mold surface (862). The surface (635) of the first lens (631) can conform to a surface profile of the second mold surface (872).

The film (842) can be the reflective polarizer (639) configured to pass through light having the first polarization state (e.g., the first linear polarization state) and reflect light having the second polarization state (e.g., the second linear polarization state) that is orthogonal to the first polarization state.

The fabrication process (800) can proceed to a step (S899), and terminates.

According to an embodiment of the disclosure, a curvature of the film (840) resulting from the positioning of the film (840) can be equal to a curvature of the film (840) when the filling of the mold cavity (880) starts. The film (840) does not need to be preformed to conform to the first mold surface (862) using a separate preforming process (e.g., the step (S520) in FIG. 5D) and the separate preforming process (e.g., the step (S520) in FIG. 5D) can be omitted from the fabrication process (800) as the surface profile of the first mold surface (862) is flatter than that of the first mold surface (562) due to the inclusion of a Fresnel structure.

The fabrication process (800) can be suitably adapted to various scenarios and steps in the fabrication process (800) can be adjusted accordingly. One or more of the steps in the fabrication process (800) can be adapted, omitted, repeated, and/or combined. Any suitable order can be used to implement the fabrication process (800). Additional step(s) can be added.

FIGS. 8A-8B show an example where the first mold (860) is above the second mold (870). Any other suitable orientation of the first mold (860) and the second mold (870) can be used in the fabrication process (800). In an example, the second mold (870) is positioned above the first mold (860). In an example, the second mold (870) is positioned to the right or to the left of the first mold (860).

The fabrication process (800) can be adapted to fabricate more than two optical components, for example, simultaneously. In an example, three optical components include a first optical component such as a lens (e.g., (631) or (632)), a second optical component, such as a thin-film optical component (e.g., (639), (641), or (642)), and a third optical component, such as a thin-film optical component (e.g., (639), (641), or (642)). A first thin film can be positioned and fastened on the first mold (860), and a second thin film can be positioned and fastened on the second mold (870). A molten resin can be injected into the mold cavity (880). During the injection process, the first thin film can be compressed against the first mold surface (862), and the second thin film can be compressed against the second mold surface (872). A solidified and cooled resin can form a lens. According to an embodiment of the disclosure, at the beginning of the injection process, the first thin film is not preformed to conform to the first mold surface (862) and/or the second thin film is not preformed to conform to the second mold surface (872).

The fabrication process (800) can be applicable to a film (e.g., the film (840)) that is flat and is not preformed (e.g., thermally or mechanically) to a curved shape. In an example, the film is curved, and the Fresnel structure insert is also curved. A mismatch (e.g., a mismatch of curvatures) between the film and the mold insert (e.g., the first mold surface) can be kept below a threshold (e.g., 0.6 mm) for the manufacturing process to avoid film folding and/or wrinkle defects.

As described above, a Fresnel lens having an identical focal length as that of a lens without a Fresnel feature can have a smaller sag or can have a flatter surface than the lens without a Fresnel feature. A Fresnel feature (or a Fresnel structure) can help to reduce a lens size (e.g., a lens thickness) or to reduce a bulky and high sag lens shape of the lens without a Fresnel feature. The compactness of the Fresnel lens can be advantageous for lens design and manufacturing methods to form lenses. As described above (e.g., with reference to FIGS. 5A-5D), to make a curved RP lens (or highly curved RP lens) using a co-mold method, the RP film is to be thermally and/or mechanically preformed to a curved shape that conforms to an intended lens shape. Without the thermal and/or mechanical preforming process, the inserted film may be folded in the co-mold process, and thus resulting in defective parts. By designing the highly curved RP lens into a less curved Fresnel RP lens with a near flat surface or a flat surface, the insert film may not need to be preformed, and thus providing a simplified and more attractive manufacturing method. Further, the Fresnel groove structure may help to bleed air in the manufacturing process to produce a lens with less defects. Otherwise, defects can be caused by air bubbles trapped between the RP film and the smooth mold insert.

The parameter values provided in the description are merely exemplary and are not intended to limit the scope of the disclosure.

Embodiments in the disclosure may be used separately or combined in any order.

A computer or computer-readable medium can control various aspects of an HMD system in which a display system (e.g., (100) or (600)) including an optical system (e.g., (110) or (610)) is incorporated. Various aspects of the display system including controlling movements and positioning of the optical components (e.g., the first lens (131) or (631), the second lens (132) or (632), the display device (120) or (620)) can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
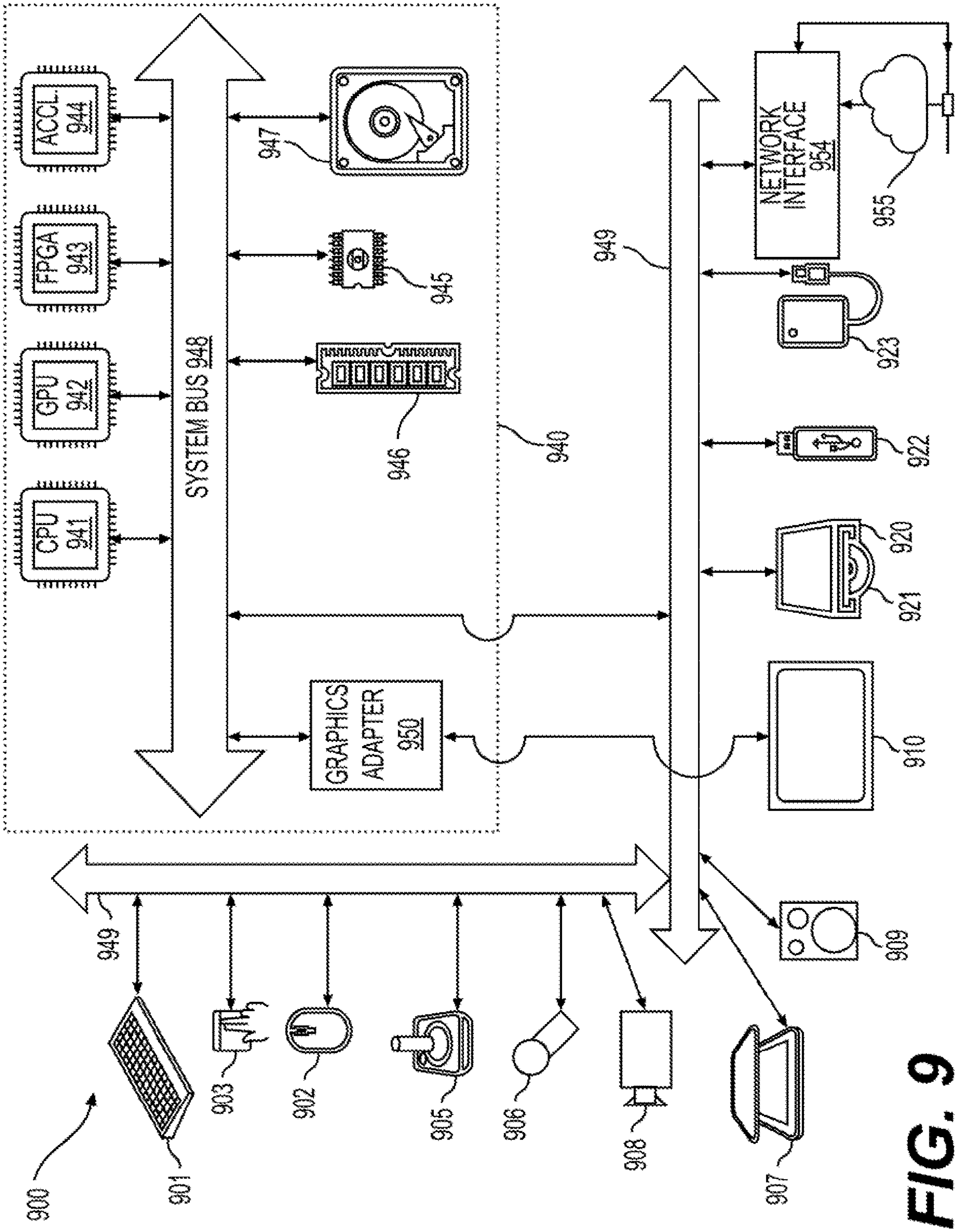
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch-screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as touch-screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, graphics adapters (950), and so forth. These devices, along with Read-only memory (ROM) (945), Random-access memory (946), internal mass storage (947) such as internal non-user accessible hard drives, SSDs, and the like, may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the touch-screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (900) having architecture, and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An optical system, comprising:

a first lens including a first optically transparent member having a first surface and a second surface, and a reflective polarizer on the first surface and configured to pass through light having a first polarization state and reflect light having a second polarization state that is orthogonal to the first polarization state, wherein the first surface of the first lens includes a first region and a second region, the first region of the first surface is smooth and at a center of the first surface, the second region of the first surface includes a Fresnel structure and surrounds the first region, the reflective polarizer includes a first region and a second region, the first region at a center of the reflective polarizer matches a profile of the first region of the first surface of the first lens and is smooth, and the second region of the reflective polarizer includes two opposite surfaces, each of the two opposite surfaces including a Fresnel structure that matches a profile of the Fresnel structure of the second region of the first surface of the first lens, the second region of the reflective polarizer surrounding the first region of the reflective polarizer.

2. The optical system according to claim 1, wherein the first surface includes a third region, the third region of the first surface is smooth and surrounds the second region of the first surface, and the reflective polarizer includes a third region that matches a profile of the third region of the first surface.

3. The optical system according to claim 1, wherein the first surface and the second surface are aspheric.

4. The optical system according to claim 1, wherein the first polarization state is a first linear polarization state, and the second polarization state is a second linear polarization state.

5. The optical system according to claim 1, comprising:

a second lens including a second optically transparent member having a third surface and a fourth surface, the second lens being a plano-spheric lens.

6. The optical system according to claim 5, comprising:

a beam splitter configured to partially transmit and partially reflect light beams from a display device, and a quarter waveplate (QWP) that is positioned between the beam splitter and the reflective polarizer, wherein a pixel array in the display device is configured to generate light beams, the beam splitter is disposed on the third surface or the fourth surface of the second lens, and the second lens is positioned between the display device and the first lens.

7. The optical system according to claim 1, wherein the first optically transparent member is made of poly (methyl methacrylate) (PMMA).

8. The optical system according to claim 1, wherein a thickness of the reflective polarizer is from 50 to 100 microns.

9. The optical system according to claim 8, wherein the Fresnel structure includes a plurality of grooves, and each depth of the plurality of grooves is less than 100 microns.

10. A fabrication method, comprising:

positioning a film including a first material on a first mold;

filling a mold cavity between a first mold surface of the first mold and a second mold surface of a second mold with a second material such that the first material conforms to a first surface profile of the first mold surface; and solidifying the second material to form a first lens, a first surface of the first lens being attached to the film, wherein the film is a reflective polarizer configured to pass through light having a first polarization state and reflect light having a second polarization state that is orthogonal to the first polarization state, the first surface of the first lens includes a first region and a second region, the first region of the first surface is smooth and at a center of the first surface, the second region of the first surface includes a Fresnel structure and surrounds the first region, the reflective polarizer includes a first region and a second region, the first region at a center of the reflective polarizer matches a profile of the first region of the first surface of the first lens and is smooth, and the second region of the reflective polarizer includes two opposite surfaces, each of the two opposite surfaces including a Fresnel structure that matches a profile of the Fresnel structure of the second region of the first surface of the first lens, the second region of the reflective polarizer surrounding the first region of the reflective polarizer.

11. The fabrication method according to claim 10, wherein a first maximum sagitta difference between (i) a maximum sagitta of the first mold surface of the first mold and (ii) a minimum sagitta of the first mold surface of the first mold is less than 0.6 millimeters.

12. The fabrication method according to claim 10, wherein a curvature of the reflective polarizer resulting from the positioning of the reflective polarizer is equal to a curvature of the reflective polarizer when the filling of the mold cavity starts.

13. The fabrication method according to claim 12, wherein the curvature of the reflective polarizer that is positioned on the first mold is flat.

14. The fabrication method according to claim 10, further comprising:

forming the mold cavity with the first mold and the second mold having the second mold surface after the positioning the reflective polarizer, a second surface of the first lens conforming to a second surface profile of the second mold surface.

15. The fabrication method according to claim 10, further comprising:

forming the mold cavity with the first mold and the second mold prior to the positioning the reflective polarizer, a second surface of the first lens conforming to a second surface profile of the second mold surface.

16. The fabrication method according to claim 10, wherein the first mold surface of the first mold includes a Fresnel structure.

17. The fabrication method according to claim 16, wherein the first mold surface of the first mold includes a first region that is smooth and the Fresnel structure of the first mold surface that surrounds the first region.

18. The fabrication method according to claim 10, wherein the filling comprises:

injecting a molten resin including the second material into the mold cavity.

* * * * *